United States Patent
Emmes

(10) Patent No.: US 6,981,125 B2
(45) Date of Patent: Dec. 27, 2005

(54) METHOD AND APPARATUS FOR MANAGING SHARED VIRTUAL STORAGE IN AN INFORMATION HANDLING SYSTEM

(75) Inventor: David B. Emmes, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 10/420,979

(22) Filed: Apr. 22, 2003

(65) Prior Publication Data

US 2004/0215919 A1 Oct. 28, 2004

(51) Int. Cl.$^7$ .............................................. G06F 12/00
(52) U.S. Cl. ..................... 711/207; 711/207
(58) Field of Search ................. 711/202–209

(56) References Cited

U.S. PATENT DOCUMENTS

| | | | |
|---|---|---|---|
| 4,456,954 A | 6/1984 | Bullions et al. | 364/200 |
| 4,792,897 A | 12/1988 | Gotou et al. | 364/200 |
| 4,979,098 A | 12/1990 | Baum et al. | 364/200 |

(Continued)

OTHER PUBLICATIONS

Article in Digital Technical Journal, vol. 8, No. 2, 1996, pp. 57-71, entitled "Extending OpenVMS for 64-bit Addressable Virtual Memory" by M. S. Harvey et al.

(Continued)

Primary Examiner—Nasser Moazzami
(74) Attorney, Agent, or Firm—William A. Kinnaman, Jr.

(57) ABSTRACT

A method and apparatus for managing shared virtual storage in an information handling system in which each of a plurality of processes managed by an operating system has a virtual address space comprising a range of virtual addresses that are mapped to a corresponding set of real addresses representing addresses in real storage. The virtual address spaces are 64-bit address spaces requiring up to five levels of dynamic address translation (DAT) tables to map their virtual addresses to real addresses. One or more shared ranges of virtual addresses are defined that are mapped for each of a plurality of virtual address spaces to a common set of real addresses. The operating system manages these shared ranges using a system-level DAT table that reference a shared set of DAT tables used by the sharing address spaces for address translation, but is not attached to the hardware address translation facilities or used for address translation. The shared range of virtual addresses straddles the $2^{42}$-byte boundary between ranges served by different third-level DAT tables and is situated between a lower private range and an upper private range so that an individual address space can map both a lower private range and a shared range using only three levels of DAT tables. Each shared address range may be shared with either global access rights, in which each participating process has the same access rights, or local access rights in which each participant may have different access rights to the given range. Access rights for each participant may be changed over the lifetime of the process.

24 Claims, 18 Drawing Sheets

U.S. PATENT DOCUMENTS

| | | | |
|---|---|---|---|
| 5,341,485 A | 8/1994 | Hattersley et al. | 711/207 |
| 5,381,537 A | 1/1995 | Baum et al. | 711/206 |
| 5,390,312 A | 2/1995 | Chiarot et al. | 711/203 |
| 5,404,477 A | 4/1995 | Jippo | 711/203 |
| 5,404,478 A | 4/1995 | Arai et al. | 711/206 |
| 5,426,748 A | 6/1995 | Brenza et al. | 711/203 |
| 5,475,827 A | 12/1995 | Lee et al. | 711/207 |
| 5,479,631 A | 12/1995 | Manners et al. | 711/138 |
| 5,577,231 A | 11/1996 | Scalzi et al. | 703/26 |
| 5,696,925 A | 12/1997 | Koh | 711/203 |
| 5,732,404 A | 3/1998 | Johnson et al. | 711/2 |
| 5,923,864 A | 7/1999 | Inoue | 711/205 |
| 6,003,123 A * | 12/1999 | Carter et al. | 711/207 |
| 6,061,773 A | 5/2000 | Harvey et al. | 711/206 |
| 6,101,590 A | 8/2000 | Hansen | 711/203 |
| 6,125,430 A | 9/2000 | Noel et al. | 711/152 |
| 6,233,668 B1 | 5/2001 | Harvey et al. | 711/206 |
| 6,286,089 B1 | 9/2001 | Greiner et al. | 711/203 |

OTHER PUBLICATIONS

Z/Architecture—Principles of Operation, Form #SA22-7832-01, pp. 3-26 through 3-47.

IBM Technical Disclosure Bulletin, vol. 13, No. 1, Jan. 1971, pp. 2404-2405, entitled "Two Level Translation" by A. Rutchka.

IBM Technical Disclosure Bulletin, vol. 14, No. 5, Oct. 1971, pp. 1608-1609, entitled "Dynamic Address Translation (DAT) For Multiprocessing System" by W. Spruth.

* cited by examiner

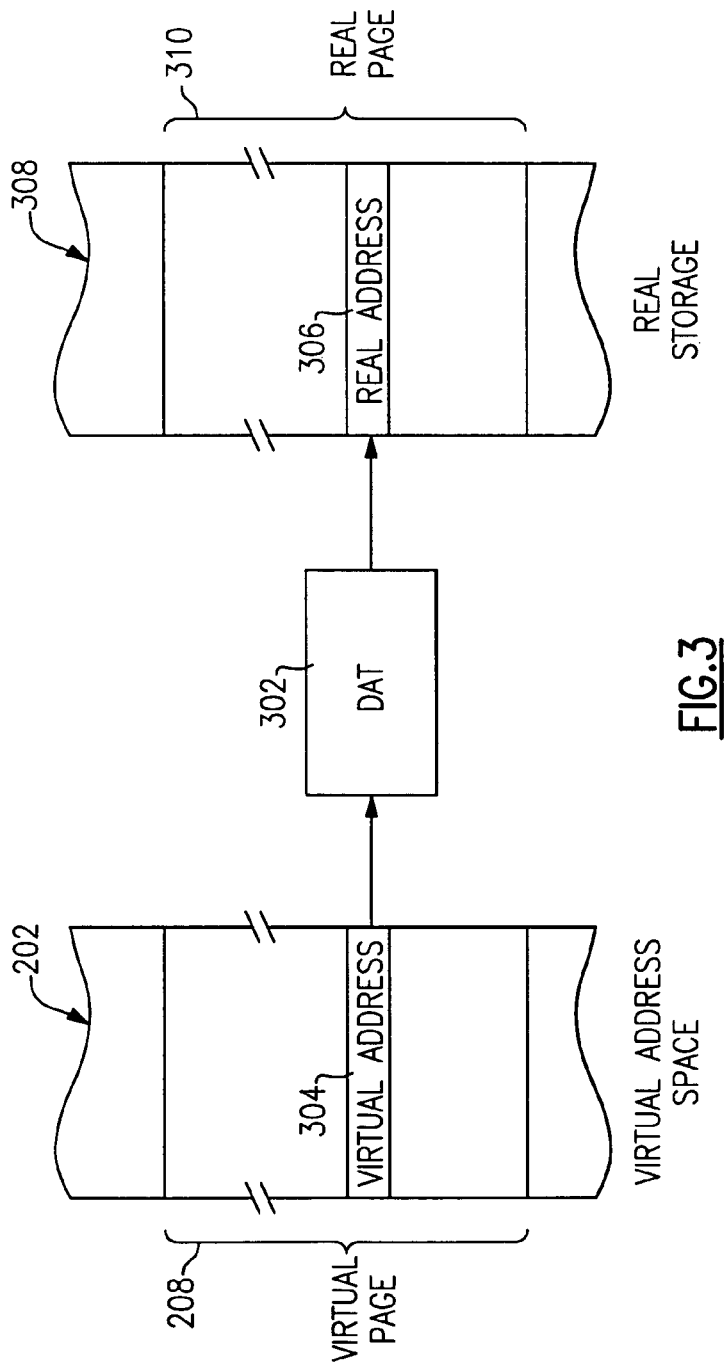
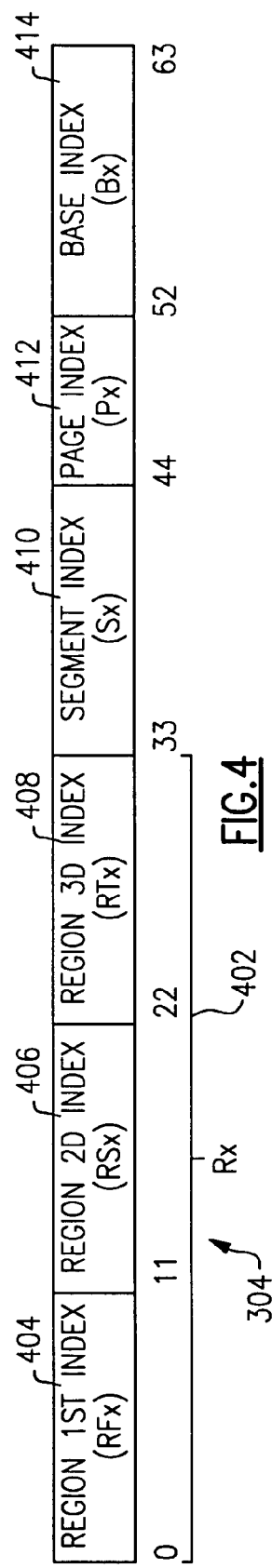
FIG.3
FIG.4

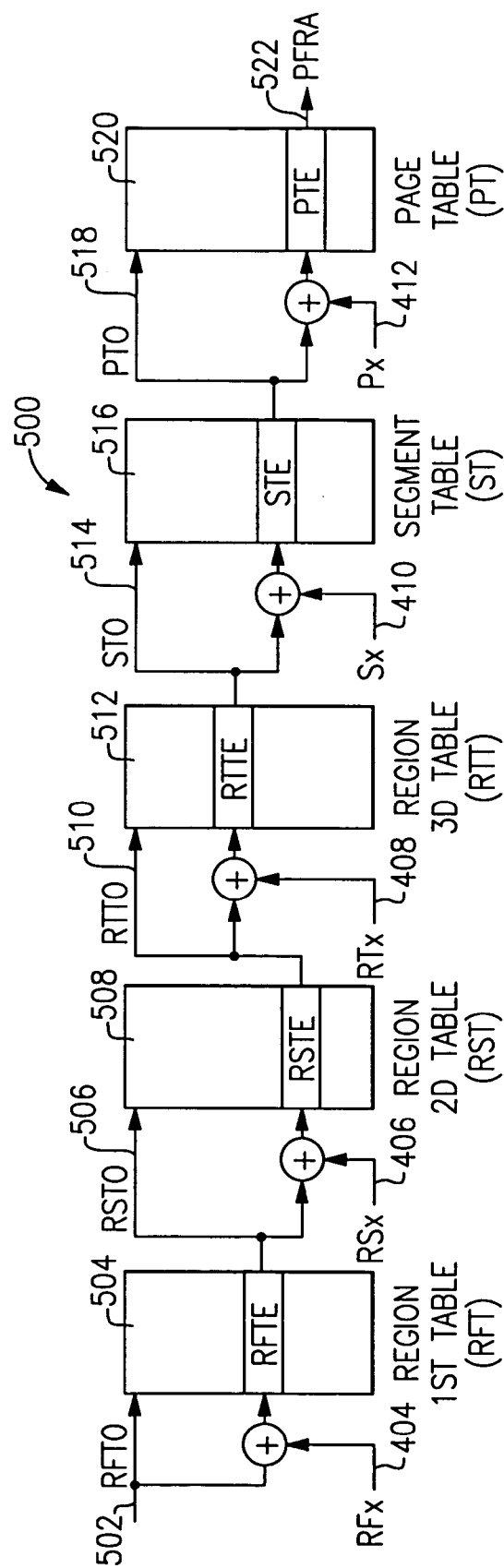
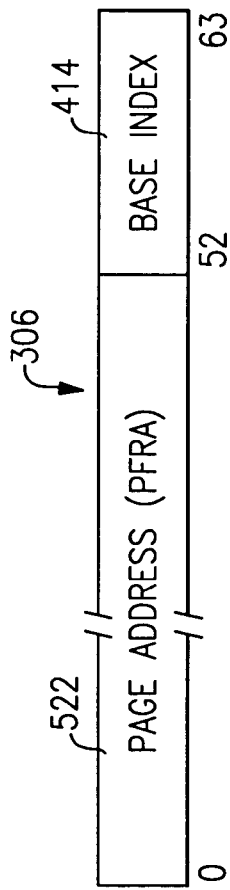
FIG.5
FIG.6

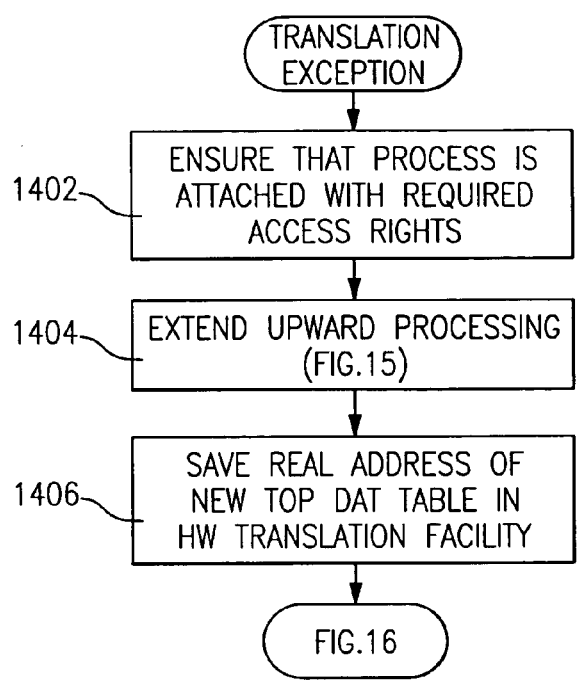
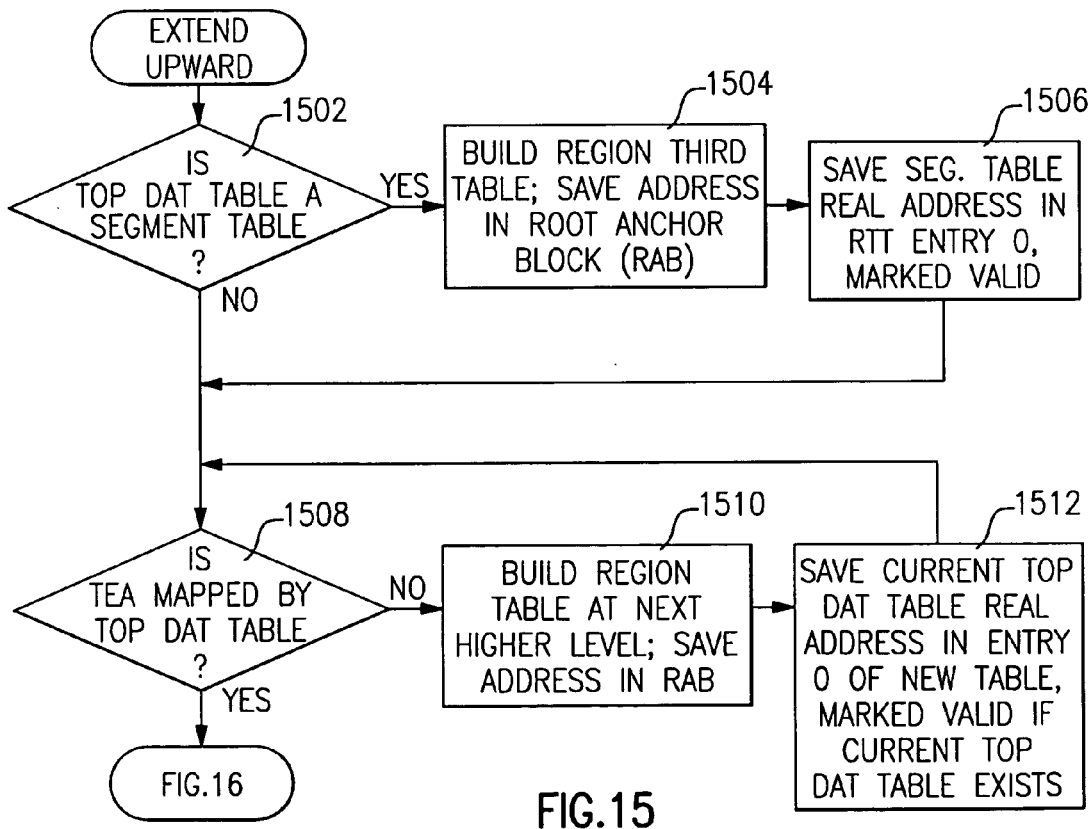

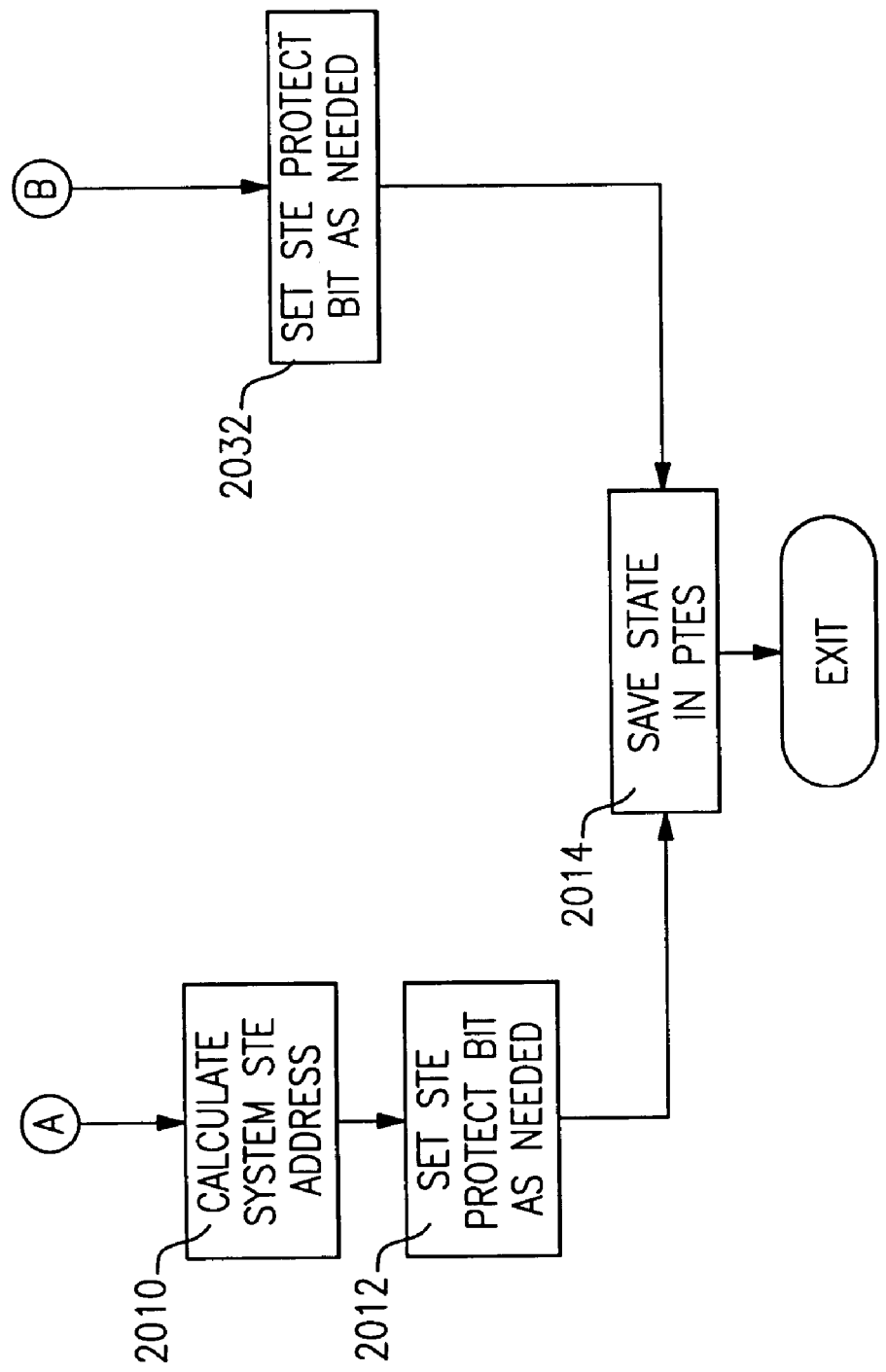

METHOD AND APPARATUS FOR MANAGING SHARED VIRTUAL STORAGE IN AN INFORMATION HANDLING SYSTEM

BACKGROUND OF THE INVENTION

1. Field of the Invention

The present invention relates generally to virtual storage management in computer systems. More particularly, the present invention relates to the layout and management of shared virtual storage within a virtual memory system including both a private space and a shared space.

2. Description of the Related Art

The use of virtual storage in computer systems, including the use of multiple virtual spaces within a given system to isolate data owned by separate processes, is widespread. This is exemplified in operating systems such as the IBM z/OS™ operating system and described in the IBM publication *z/OS MVS Initialization and Tuning Guide*, SA22-7591-01 (March 2002), incorporated herein by reference.

It is common in virtual storage environments that address translation is performed in a hierarchical fashion. Groups of bits from the virtual address serve as indices to fetch real storage addresses from a dynamic address translation (DAT) table for the next layer of translation and eventually locate the real storage location for the virtual address itself. These DAT tables may be referred to generically as page tables, although in the IBM z/Architecture™ they are most recently referred to as region, segment and page tables, depending on which level is being referenced. The number of levels of tables in the most recent version of the z/Architecture may be two, three, four, or five, depending on the amount of virtual storage that is to be mapped. This is described in the IBM publication *z/Architecture Principles of Operation*, SA22-7832-01 (October 2001), incorporated herein by reference.

To perform address translation the machine hardware sequentially fetches from each table in order to proceed to the next layer of translation. To avoid this overhead for each address translation, it is common for there to be a hardware translation buffer or cache, in which the results (or partial results) of prior address translations are saved. This has been described in such articles as "Two Level Translation" by A. Rutchka, Vol. 13, No. 8, January 1971, of the *IBM Technical Disclosure Bulletin*, and "Dynamic Address Translation for Multiprocessing System" by W. Spruth, Vol. 14, No. 5, October 1971, of the *IBM Technical Disclosure Bulletin*. Depending on the locality of reference, the size of the hardware translation buffer, and the algorithms used to decide which addresses to keep when the hardware translation buffer is full, there is a lesser or greater amount of address translation overhead associated with program execution. For this reason, operating system designers are highly motivated to minimize the number of levels of address translation wherever this is an option.

In prior systems of z/OS and earlier technologies such as OS/390™, MVS/ESA™, MVS/XA™, and the like, the virtual address space consisted of a private space and a common area straddling 16 MB ($2^{24}$ bytes) which was actually shared across all address spaces. (In this application, as is customary in discussions of storage addresses, multipliers such as kilo- (K), mega- (M), giga- (G) and the like refer to powers of 2 rather than powers of 10. Thus, a kilobyte (KB) means $2^{10}$ rather than $10^3$ bytes, a megabyte (MB) means $2^{20}$ rather than $10^6$ bytes, and a gigabyte (GB) means $2^{30}$, not $10^9$, bytes.) As for all sharing technologies, sharing is accomplished by using the same real frame for a given page across multiple address spaces. In the case of the common area, all common segments are mapped by a set of common page tables which are pointed to by the appropriate entries in the segment tables of each address space. In this common area are system (or kernel) code and control structures, together with authorized code and control structures. Page tables (and segment tables) in these prior systems are virtualized and hence consume some 8 MB of pre-allocated virtual space within each private space. In order to provide access to the common space, the segment table entries for the common segments are identical in content for each address space.

The earliest data sharing in these systems was via the common area, but this is only available to privileged code. Later, general data sharing was provided on a page-oriented basis which was able to give different access modes (read/write vs. read-only for example) to different views using hardware-enforced protection bits in the page table entry. This was adequate for small ranges, but resulted in undesirable overhead to track the states of the pages within a data sharing group once the amount of shared data grew. This was followed in later releases by facilities for data sharing in segment-oriented ranges, so that the entire page table could be shared. In this case, a segment table entry would record the address of the shared page table so that two or more address spaces could share the same segment. These techniques were limited to address ranges below 2 GB ($2^{31}$ bytes) due to the underlying architecture present at the time these services were introduced.

With the introduction of 64-bit addressing in z/OS, there was a desire to provide a more efficient data sharing facility which scaled with the tremendous expansion of addressability provided by doubling the address width. Continued use of virtualized DAT tables would consume approximately $2^{56}$ bytes for the full 64-bit addressing capability; there are $2^{44}$ segments and each segment requires a 4 KB (4,096-byte) page table in the z/Architecture. To avoid this huge loss of virtual space for virtual storage management purposes a new approach was highly desirable. Part of this z/Architecture provides for the ability to reference real storage addresses directly, even while running in a DAT-enabled mode. This is described in commonly owned U.S. Pat. No. 5,479,631, entitled "System for Designating Real Main Storage Addresses in Instructions While Dynamic Address Translation Is On", as well as in the previously referenced z/Architecture publication. With this facility it is possible for the operating system to provide virtual storage management, including the updating of DAT tables without removing virtual storage from the application's pool of virtual addressability. This technology to use unvirtualized DAT tables has been available in z/OS since Release 1.2.

SUMMARY OF THE INVENTION

In general, the present invention provides a method and apparatus for a virtual storage system comprising multiple virtual address spaces, each of which consists of a private space unique to a process and a shared space which is selectively accessible by range to one or more processes, i.e., there is the ability to control which processes are allowed to participate. Each range within the shared space may be accessed by zero, one or multiple processes, and the participating processes may be different for each address range. Each shared range is dynamically created by some process, subject to installation policy.

Furthermore, each such address range may either be shared with the same access rights (read/write, read-only or hidden) for all participating processes, referred to as global access rights, or each participant may have different access rights to the given range, referred to as local access rights. Additionally, the access rights for each participant may be changed over the lifetime of the process. Thus in the case of local access rights, one group of participants may have update authority, while another group of participants may have read-only authority, while the range may be hidden (inaccessible) to others; and this may be dynamically changed during the lifetime of each process for any given range. Of course, in the case of global access rights, a change to the access rights affects all participants equally and results in the same new mode of access for all participants. The global versus local access rights quality is immutable for the life of the shared range.

It is a feature of the present invention that the total size of the shared space may be specified by the installation and that the virtual storage layout minimizes the number of layers of DAT tables required to address both the shared space and the private space relative to the installation specification. There is no restriction on what type of data may be resident within the shared space, i.e., no predefined subareas are present for stacks, heaps, program executables, databases, etc. Additionally, the invention extends the prior technology wherein no virtual storage for DAT tables is utilized; this maximizes the amount of virtual storage available to the application and reduces the real storage resources required. In particular, there are no DAT tables which map only other DAT tables.

The present invention minimizes the unusable space within each address space, as there is no need to map process-private space to the shared space. Instead, each process accesses the shared virtual addresses directly, constrained by the access rights inherent to the process. The unusable space for a given process is thus the size of the shareable space minus the amount of shared space utilized by the process. Other approaches have required that the process map the shared data into its process private space in order to control the access rights, which implies that the unusable space is the size of the entire shareable space, which implies more unusable space is present in these other approaches.

The layout of the address space is constrained by compatibility considerations so that addresses 0 through $2^{31}-1$ bytes behave as in existing systems (this corresponds to the existing 31-bit virtual addressing). In this invention, the layout of the higher virtual addresses provides a shareable range centered around the boundary where a region second table becomes necessary, which happens to be $2^{42}$ in the z/Architecture. The size of the shareable range is configurable by the customer. The lower boundary of the shareable range is allowed to be as low as half the range below the special boundary, but is higher when the shareable range is smaller than $2^{42}$. The upper boundary of the shareable range is determined by the customer-specified total size added to the lower boundary. This layout allows a region third table to suffice when the shared virtual storage is smaller than $2^{41}$ bytes, while concurrently giving each space approximately $2^{41}$ bytes of private storage. Other tradeoffs between private and shareable sizes can be made that are consistent with this same requirement for no more than a single region third table, as well as with existing compatibility requirements below 2 GB.

Virtual addresses above 2 GB and outside this shareable range are only visible to those processes which have addressability to the address space (private space). Addresses within this shareable range are selectably shareable with other processes using operating system storage management interfaces. The shareable space starts on a boundary which is aligned with a region (a region is the range of addresses mapped by an entire segment table, which happens to be 2 GB in the z/Architecture) and is a multiple of this size. This implies that each entry in the lowest-level (i.e., third) region table describes either a shareable range or a private range.

Each address space which attaches to a shared range is managed by a shadow table which describes which ranges are visible to the given space. This is some subset of the system-wide table which tracks all shareable ranges which have been created. When the space faults on or requests operating system services against a virtual address in the shareable range, the address is verified to be within a range which has been attached by the space. Each such range has an associated interest count to allow the system to easily track when a shared range is no longer in use across the entire system.

The operating system maintains a set of DAT tables for its own use which describe the state of the shared pages, including the real addresses needed in address translation. However, these system-related tables are not attached to the hardware DAT structure, since the operating system role is to maintain the DAT tables; the operating system has no interest in actually referencing the shared data itself. Instead, the operating system traverses these tables in a fashion similar to that used by the hardware itself, starting from a root control block. This choice to keep the tables unattached avoids the overhead associated with attaching/unattaching the DAT tables and likewise avoids the overhead of using them to reference virtual storage (such as virtualized DAT tables). This same root control block anchors the frame-related control blocks for the DAT tables, both those for DAT tables used by the operating system as well as the shared DAT tables which form part of the hardware translation path for process-owned shareable ranges.

As mentioned earlier, each address space owns its set of DAT tables which describe the private (non-shareable) area. Some of these tables have entries that point to the shared DAT tables managed by the operating system. To avoid thrashing, once a new level of attached DAT table is built to support a reference for a virtual address, it is left intact, even if it is no longer needed. Removing the current top layer of translation (which could be any of the three region table types) is complicated by the need to signal all processors to remove their cached translation tables.

However, this complication does not apply to the operating system-implemented DAT tables for the shareable range, since they are left unattached.

For shared ranges which have global access rights for all viewers, the access control is maintained in the shared page table entries which map the segment (for segment-level sharing) or the shared segment table entries (for region-level sharing). In the former case, the protect status is also saved in the unattached DAT table entry for the segment to serve as an easy single summary bit. (The same can conceptually be done for the hidden attribute when the DAT table format provides software-reserved fields.) Segment fault or region fault resolution processing, respectively, ensures that the correct access rights are propagated from the unattached DAT table entries to the process-related segment or region table entries to make the state known to the hardware at the highest (earliest) possible level in the process of DAT.

For shared ranges which are allowed to have a different access protection for each viewer (local access rights), the control is maintained in the process-related DAT table entry which maps the segment (for segment-level sharing).

Region-level sharing does not support local access rights, since the z/Architecture does not have region table entry controls for protection.

During swap-out processing, all DAT tables which are owned by the address space and which map (indirectly) shared ranges are discarded after deregistering interest in the shared tables owned by the operating system. In this case of local access rights, swap-out is aware of this information in the process-related DAT tables and preserves the information prior to tossing the process-related DAT tables. The shared DAT tables are owned by the operating system and not the address space, so they are not affected by swap-out. This approach in swap-out addresses a problem for shared virtual storage which relates to the fact that the use of a given page by each address space is indistinguishable from the use by any other space insofar as the hardware reference bits are concerned. This implies that an address space might reference a page only once and yet hold on to its related DAT tables, since the operating system cannot determine whether the address space is actively using those DAT tables. The page might be referenced by other spaces using alternate translation paths and this is not detectable by the operating system since there is only a single hardware reference bit per page. This approach allows swap-out to limit this undesirable behavior, so that the process is forced to demonstrate a need for the DAT tables after swap-in, in exchange for a small one-time cost to rebuild a few DAT tables.

The frames whose control blocks are anchored in the root anchor block for the system-managed shared resources are subject to similar paging algorithms as for existing common area support, i.e. UIC update and stealing, and has no unique features that need to be addressed in the current invention.

The invention is preferably implemented as part of a computer operating system. Such a software implementation contains logic in the form of a program of instructions that are executable by the hardware machine to perform the method steps of the invention. The program of instructions may be embodied on a program storage device comprising one or more volumes using semiconductor, magnetic, optical or other storage technology.

BRIEF DESCRIPTION OF THE DRAWINGS

FIG. 3 shows the address translation process at a high level.

FIG. 4 shows the makeup of a 64-bit virtual address.

FIG. 5 shows the translation tables used for an address space to transform a virtual address into a real address.

FIG. 6 shows the formation of the real address from the page frame real address (PFRA) and the byte index (BX).

FIG. 14 shows the procedure for address translation exception resolution.

FIG. 15 shows the Extend Upward function.

DETAILED DESCRIPTION OF THE INVENTION

Introduction

Figure 1:
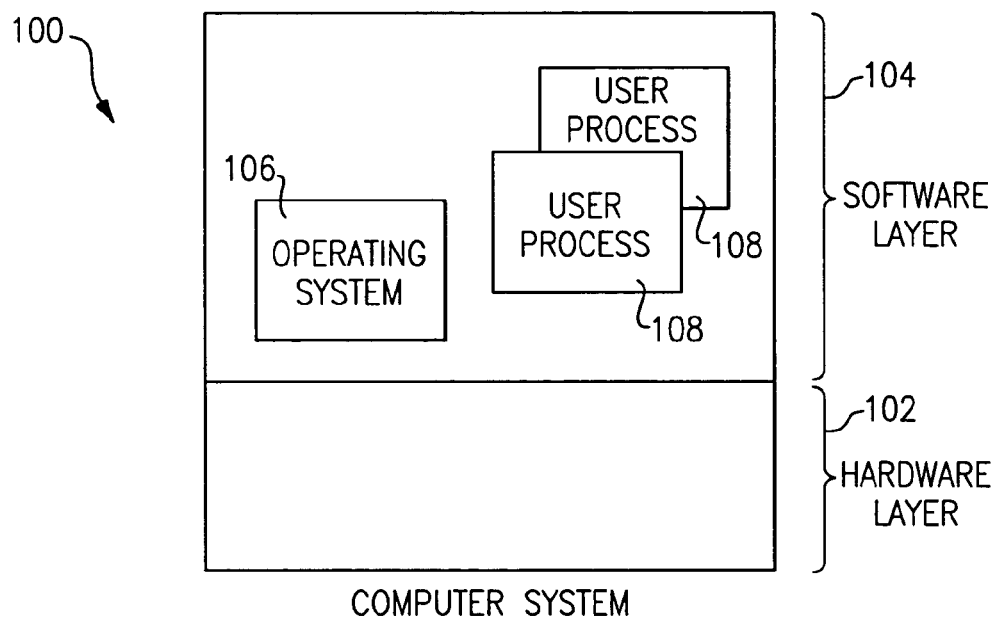
FIG. 1 shows a computer system incorporating the present invention.

FIG. 1 shows a computer system 100 incorporating the present invention. Computer system 100 may comprise either a separate physical machine or a separate logical partition of such a physical machine. Computer system 100 comprises a hardware layer 102 and a software layer 104. Hardware layer 102 contains the hardware elements of the system 100, including one or more central processing units (CPUs), dynamic address translation tables, main storage, remote storage (e.g., disk drives) and the like. These hardware elements operate in a conventional manner in the present invention and are therefore not separately shown in FIG. 1. While the present invention is not limited to any particular hardware platform, in a preferred embodiment the hardware layer 102 comprises an IBM zSeries™ server having the 64-bit architecture specified in the previously referenced IBM publication z/Architecture Principles of Operation, SA22-7832-01 (October 2001).

Software layer 104 contains an operating system 106 and one or more user processes 108. Again, while the present invention is not limited to any particular software platform, in a preferred embodiment the operating system comprises a version of the IBM z/OS operating system, described in such references as the IBM publication z/OS MVS Initialization and Tuning Guide, SA22-7591-01 (March 2002), referenced above. Unless otherwise indicated, references below to "the system" are to the operating system 106.

Figure 2:
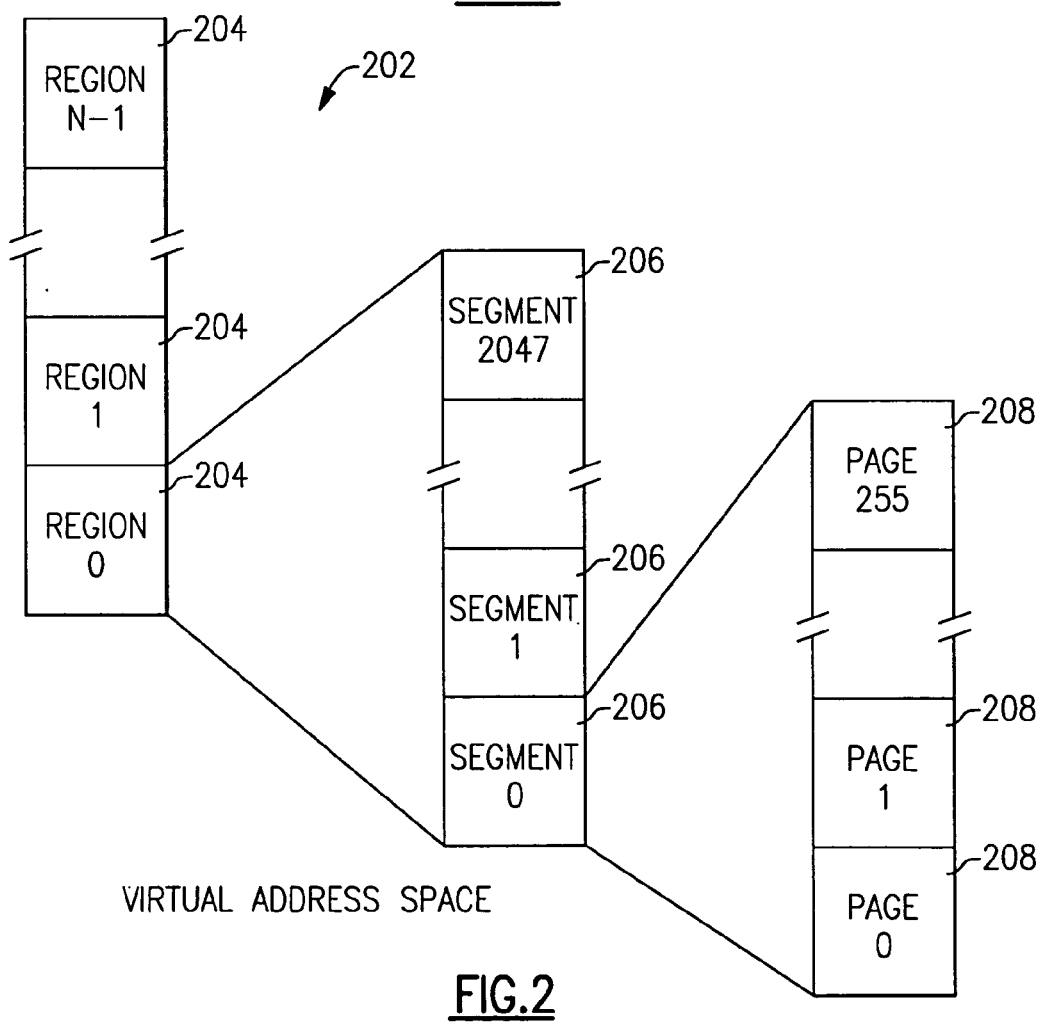
FIG. 2 shows the various subdivisions of a virtual address space in the computer system of FIG. 1.

Referring now to FIG. 2, associated with each user process 108 is a virtual address space 202, representing a range of addresses referenced by the process 108 and ranging from zero to one less than the address space size. Each virtual address space 202 may consist of either a single region 204 of 2 GB ($2^{31}$ bytes) or up to $2^{33}$ such 2 GB regions 204 aligned on 2 GB boundaries for a total of 264 bytes. Each region 204 in turn consists of 2,048 ($2^{11}$) segments 206 of 1 MB (220 bytes) each, aligned on 1 MB boundaries, while each segment 206 in turn consists of 256 ($2^8$) pages 208 of 4 KB ($2^{12}$ bytes) each, aligned on 4 KB boundaries.

Referring now to FIG. 3, hardware layer 102 contains a dynamic address translation (DAT) unit 302 for converting a virtual address 304 in the virtual address space 202 used by a process 108 to a real address 306 in main storage 308. This is done on the page level so that pages 208 of the virtual address space 202 are mapped to corresponding pages 310 in real storage 308. FIGS. 4–6 show the address translation procedure in more detail.

Referring first to FIG. 4, a 64-bit virtual address 304 is made of bits 0–63, with bit 0 being the most significant bit (MSB) and bit 63 being the least significant bit (LSB). Address 304 may be considered as consisting of, in order from the most significant to the least significant part of the address:

1. A 33-bit region index (RX) (bits 0–32) 402 identifying a particular 2 GB region 204 within up to a $2^{64}$-byte virtual address space 202. For reasons that will be apparent, this region index 402 is further divided into an 11-bit region first index (RFX) 404 (bits 0–10), an 11-bit region second index (RSX) 406 (bits 11–21), and an 11-bit region third index (RTX) 408 (bits 22–32).
2. An 11-bit segment index (SX) 410 (bits 33–43) identifying a particular 1 MB segment 206 within a 2 GB region 204.
3. An 8-bit page index (PX) 412 (bits 44–51) identifying a particular 4 KB page 208 within a 1 MB segment 206.
4. A 12-bit byte index (BX) 414 (bits 52–63) identifying a particular byte within a 4 KB page 208.

The various virtual address portions 404–414 are so named because of the tables they index in address translation. FIG. 5 shows the address translation pipeline 500 of the DAT unit 302, while FIG. 6 shows the real address 306 generated as a result. Referring to these figures, in its most elaborate form, the address translation process works as follows:

1. An address 502 known as the region first table origin (RFTO) that is generated for a particular address space 202 points to the real base address of a region first table (RFT) 504. The 11-bit region first index (RFX) 404 is added as an offset (after being multiplied by the displacement between table entries) to the base address 502 (RFTO) to access a particular entry in RFT 504. This entry, known as a region first table entry (RFTE), contains an invalid bit (I) indicating when set to one that the entry is an invalid entry that cannot be used for address translation (because the corresponding set of regions are not in real storage 308). If the entry is valid, then it also contains an address 506 known as the region second table origin (RSTO) that points to the real base address of a particular region second table (RST) 508.
2. The 11-bit region second index (RSX) 406 is added as an offset (after being multiplied by the displacement between table entries) to the base address 506 (RSTO) to access a particular entry in RST 508. This entry, known as a region second table entry (RSTE), contains an invalid bit (I) indicating whether the entry is a valid entry that can be used for address translation (because the corresponding set of regions are in real storage 308). If the entry is valid, then it also contains an address 510 known as the region third table origin (RTTO) that points to the real base address of a particular region third table (RTT) 512.
3. The 11-bit region third index (RTX) 408 is added as an offset (after being multiplied by the displacement between table entries) to the real base address 510 (RTTO) to access a particular entry in RTT 512. This entry, known as a region third table entry (RTTE), contains an invalid bit (I) indicating whether the entry is a valid entry that can be used for address translation (because the corresponding region is in real storage 308). If the entry is valid, then it also contains an address 514 known as the segment table origin (STO) that points to the real base address of a particular segment table (ST) 516.
4. The 11-bit segment index (SX) 410 is added as an offset (after being multiplied by the displacement between table entries) to the base address 514 (STO) to access a particular entry in ST 516. This entry, known as a segment table entry (STE), contains an invalid bit (I) indicating whether the entry is a valid entry that can be used for address translation (because the corresponding segment is in real storage 308), as well as a protection bit (P) indicating when set to one that write accesses cannot be made to the segment (even if the P bit for the particular page is not set to one). If the entry is valid, then it also contains an address 518 known as the page table origin (PTO) that points to the real base address of a particular page table (PT) 520.
5. The 8-bit page index (PX) 412 is added as an offset (after being multiplied by the displacement between table entries) to this base address to access a particular entry in PT 520. This entry, known as a page table entry (PTE), contains an invalid bit (I) indicating whether the entry is a valid entry that can be used for address translation (because the corresponding page is in real storage 308), as well as a protection bit (P) indicating whether write accesses can be made to the page (providing they can be made to the segment). If the entry is valid, then it also contains what is known as a page frame real address (PFRA) 522 that forms the most significant 52 bits of a 64-bit real address 306. When padded with twelve zeros on the right, it represents the base address of the page 310 in real storage 308.
6. Finally referring to FIG. 6, PFRA 522 is concatenated with the 12-bit byte index (BX) 414 to form the real address 306.

As explained in the z/Architecture publication referenced above, not all of the DAT tables are necessarily used for a particular address space. Even though the z/Architecture permits address spaces 202 of up to $2^{33}$ regions 204 of 2 GB ($2^{31}$ bytes) each, a particular address space 202 may be configured to be smaller. Thus, if the address space 202 consists of a single 2 GB region 204, bits 0–32 of the address are set to zero and a segment table 516 is used as the highest-level DAT table. Similarly, if the size of the address space is $2^{11}$ regions 204 ($2^{42}$) bytes or smaller, bits 0–21 of the address are set to zero and a region third table 512 is used as the highest-level DAT table. Likewise, if the size of the address space is $2^{22}$ regions 204 ($2^{53}$ bytes) or smaller, bits 0–10 of the address are set to zero and a region second table 508 is used as the highest-level DAT table. Only if a virtual address space 202 contains more than $2^{22}$ regions 204 is a region first table 504 required.

The highest-level translation table that is referenced by the machine hardware, together with all lower-level translation tables that are directly or indirectly referenced by the highest-level table, is said to be "attached" to the translation hardware. (In the z/Architecture, the highest-level table is attached when it is designated by an attaching address space control element (ASCE), as described in the referenced architecture publication.) The chain of address references from the highest-level table to the lowest-level (page) table used for a particular address translation forms what is known as a "translation path".

Address Sharing

With this background, the concepts of the present invention relating to address sharing can be described. Most portions of the virtual address spaces 202 of the various processes 108 are private in the sense that they do not map to overlapping portions of real storage 308. On the other hand, shared portions of virtual address spaces do map to a common portion of real storage 308.

Figure 7A:
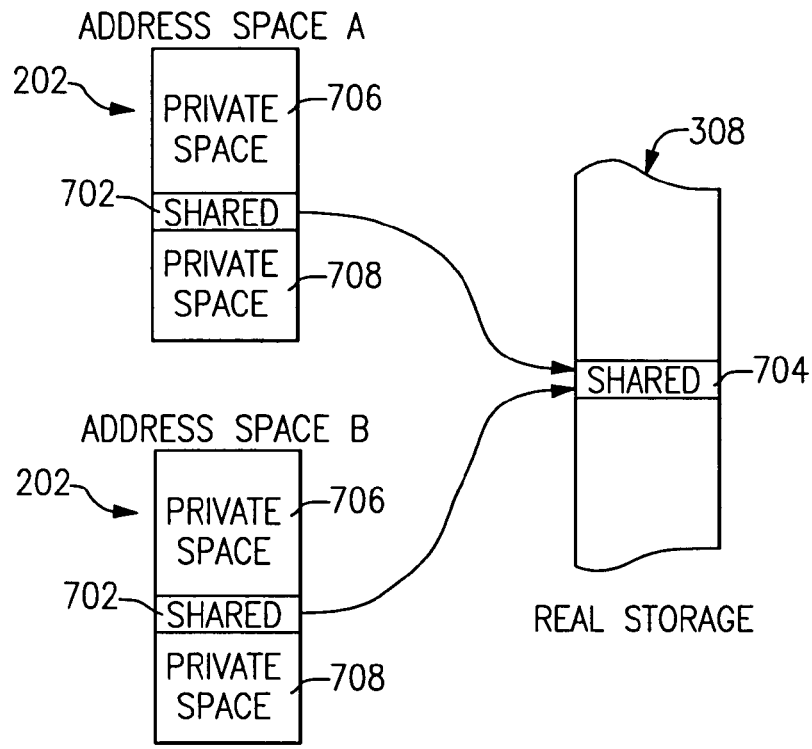
FIG. 7A shows the general concept of address sharing between virtual address spaces.

Thus, FIG. 7A shows a pair of virtual address spaces 202 having shared portions 702 (also referred to herein as "shareable spaces") mapping to a common portion 704 of real storage 304.

In accordance with the present invention, an installation-specifiable value, shr_size, is provided to define the size of the shareable space 702. For purposes of this description, this is assumed to be a multiple of the region size (2 GB in the embodiment shown), including the value zero, in which case there is no new shareable space. Apart from this special case, there are three areas within the address space 202. The shareable space 702 forms one area, and is surrounded by a private space 706 with higher addresses and a private space 708 with lower addresses. (In z/OS, the lower private space 708 actually contains the range below $2^{31}-1$ bytes with the same layout as prior releases for compatibility purposes and is thus not exclusively private; it contains the common area previously described. As this special range below 2 GB is not germane to the invention, the address space 202 is treated as having three areas.) During system initialization, this shr_size value is used to calculate the bounds of the three areas 702, 706 and 708. Each process 108 is initially allocated an address space 202 which has two levels of DAT translation (the segment and page tables described above), so as to minimize system resources and the cost of address translation. Processes 108 may be authorized by the installation to acquire more virtual storage, in which case up to three additional levels of DAT tables may be required at the point where an address reference is made.

Figure 7B:
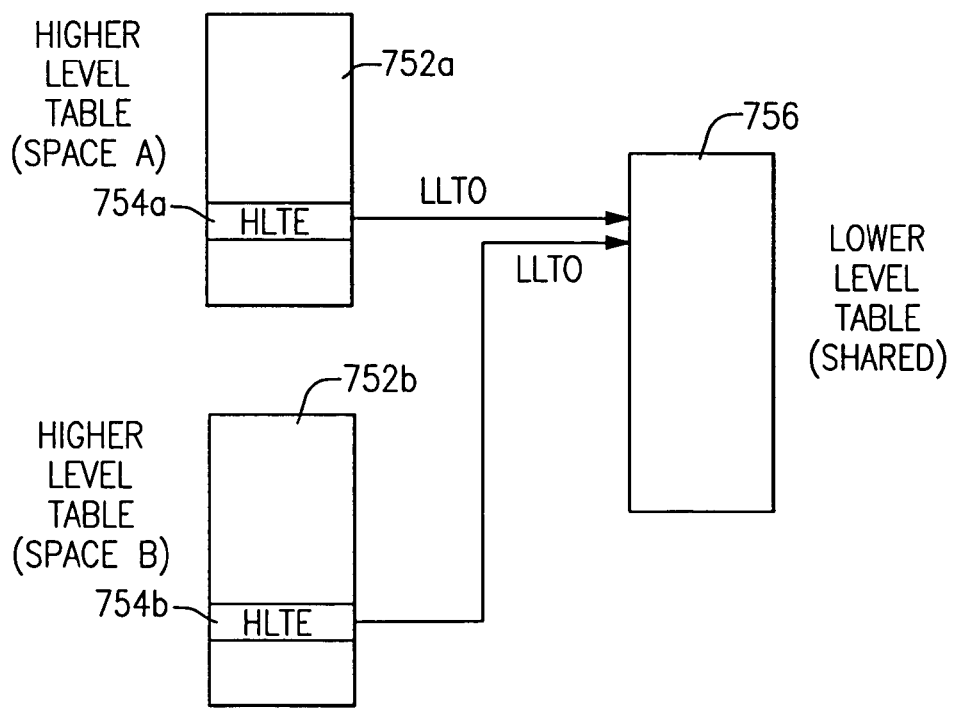
FIG. 7B shows how DAT tables are used to accomplish address sharing.

FIG. 7B shows how DAT tables are used to accomplish address sharing. As shown in the figure, respective address spaces A and B have higher-level tables 752a and 752b containing entries 754a and 754b pointing to the origin of a single lower-level table 756 that is shared by the two address spaces. Thus, higher-level tables 752a and 752b may be region third tables 512 containing entries 754a and 754b pointing to a shared segment table 516, in which case the region 204 corresponding to the shared segment table 516 is shared by the two address spaces A and B. Similarly, higher-level tables 752a and 752b may be segment tables 516 containing entries 754a and 754b pointing to a shared page table 520, in which case the segment 206 corresponding to the shared page table 520 is shared by the two address spaces A and B. Depending on whether or not the entries 754a and 754b occur at the same place in their respective tables 752a and 754a (and similarly for any entries in even higher-level tables directly or indirectly referencing tables 752a and 752b), the shared range 704 (FIG. 7A) may or may not correspond to the same range of virtual addresses in the two address spaces A and B. In the embodiment shown, however, a shared address range does correspond to the same numeric range of virtual addresses in each of the address spaces sharing the range. Although FIG. 7B shows only two higher-level tables 752a and 752b, a greater number of higher-level tables could reference a single lower-level table to accomplish address sharing across additional virtual address spaces 202. Further, while FIG. 7B shows only a single pair of entries 754a and 754b in the higher-level tables 752a and 752b referencing a shared lower-level table 756, one could also have multiple pairs of entries in the higher-level tables 752a and 752b, each pair referencing a different shared lower-level table 756, to increase the size of a shared range or to create additional shared ranges.

Figure 8:
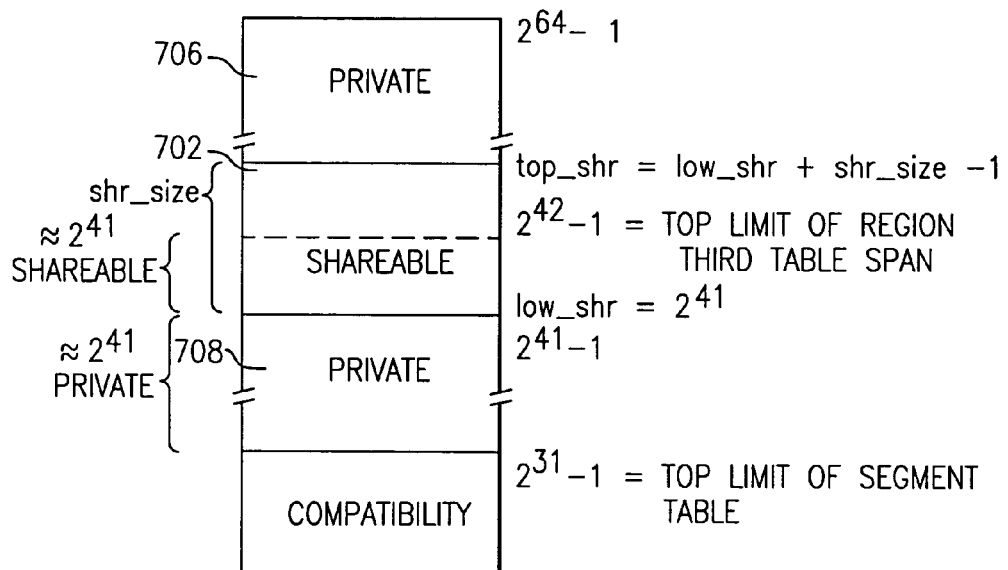
FIG. 8 shows an address space having a shareable space whose size equals or exceeds the span of a region third table.

FIG. 8 depicts the layout of a single address space 202 among multiple such spaces where the size (shr_size) of the shareable space 702 equals or exceeds the span of a region third table 512 ($2^{42}$ bytes in the embodiment shown). The lowest shareable address (low_shr) in this circumstance is half the span of a region third table 512 (i.e., $2^{41}$ bytes for a table spanning $2^{42}$ bytes), while the highest shareable address is low_shr+shr_size−1. In this case, half of the region third table 512 for the range 0 to $2^{42}-1$ maps private space and half maps shareable space. Depending on the value for shr_size, a region second table 508 or even a region first table 504 may be needed to map the high end of the shareable space 702.

The mapping shown in FIG. 8 allows a "small" user to fit within a single region third table when such a user needs no more than $2^{41}$ bytes for non-shared space and the shared range fits below $2^{42}$ bytes. Such a user needs a second region third table only when it needs more than $2^{41}$ bytes for non-shared space or the shared space needs more than $2^{41}$ bytes for allocated shared ranges.

Figure 9:
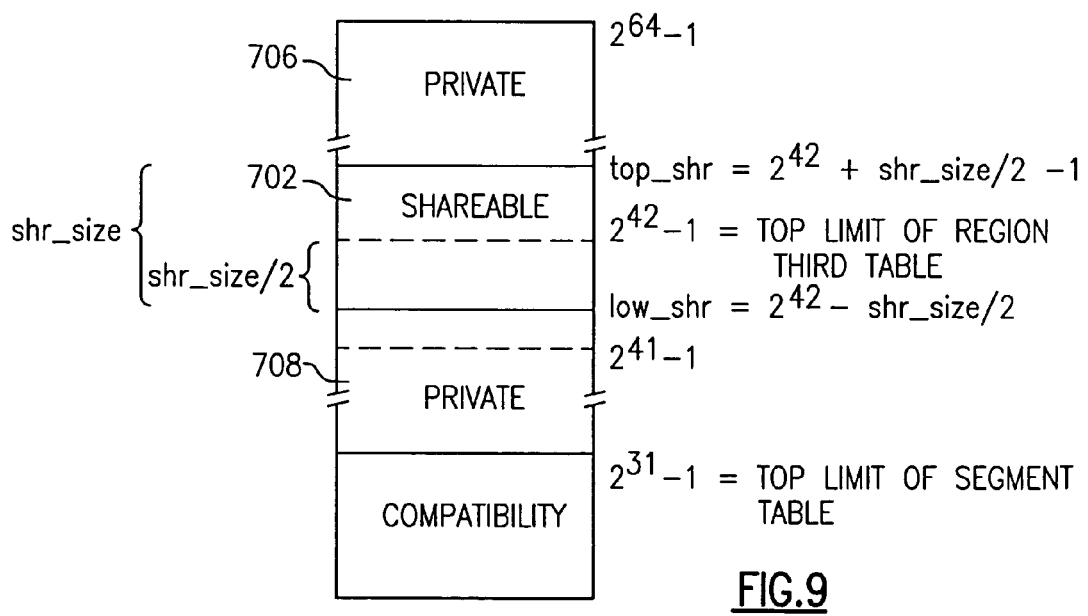
FIG. 9 shows an address space having a shareable space whose size is less than the span of a region third table.

FIG. 9 depicts the layout of a single address space 202 among multiple such spaces where the size (shr_size) of the shareable space 702 is less than the span of a region third table 512. The lowest shareable address (low_shr) in this circumstance is the span of a region third table 512 less half of shr_size (i.e., $2^{42}$−shr_size/2), while the highest shareable address is the span of a region third table 512 plus one less than half of shr_size (i.e., $2^{42}$+shr_size/2−1). (If shr_size/ 2 is not an integral multiple of the region size, rounding is performed to maintain region boundaries.) In this case, half the shareable space 702 fits within a region third table 512, and the private space 708 mapped by the region third table 512 exceeds half the region third table's span. All the shareable space 702 is spanned by a single region second table 508 in this case. This approach could easily be modified to allow the entire shareable space 702 to be mapped by the high end of a region third table 512 whenever shr_size was below some installation-specifiable threshold value.

Data Structures

Figure 10:
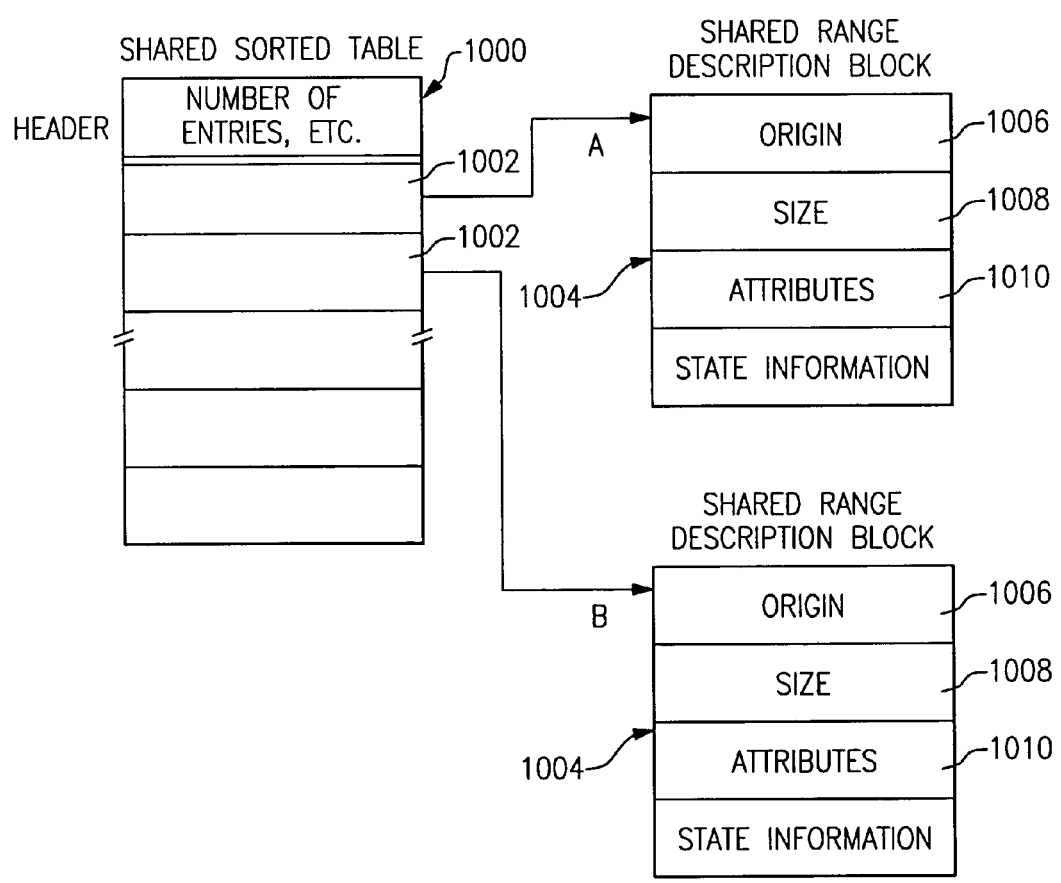
FIG. 10 shows the system-wide shared sorted table (SST) of the present invention.

FIG. 10 depicts a table 1000 called the shared sorted table (SST) for its organization in the preferred embodiment. This is a system-level table, meaning that there is one such shared sorted table 1000 to track all allocated shared memory ranges 702 within the operating system 106. Each entry 1002 in this table 1000 represents a distinct and disjoint shared range 702, which is conceptually represented by a control block 1004. Each range 702 has an associated origin 1006, size 1008, and attributes 1010, where the attributes may include an indication for local versus global access scope, among others. In the preferred embodiment, the entries 1002 are sorted by ascending virtual address for the corresponding shared range 702 so that a binary search may be used when "scanning" the table 1000 for a particular virtual address. However, other means for implementing the shared table 1000 beyond a sorted ordering are possible.

Figure 11:
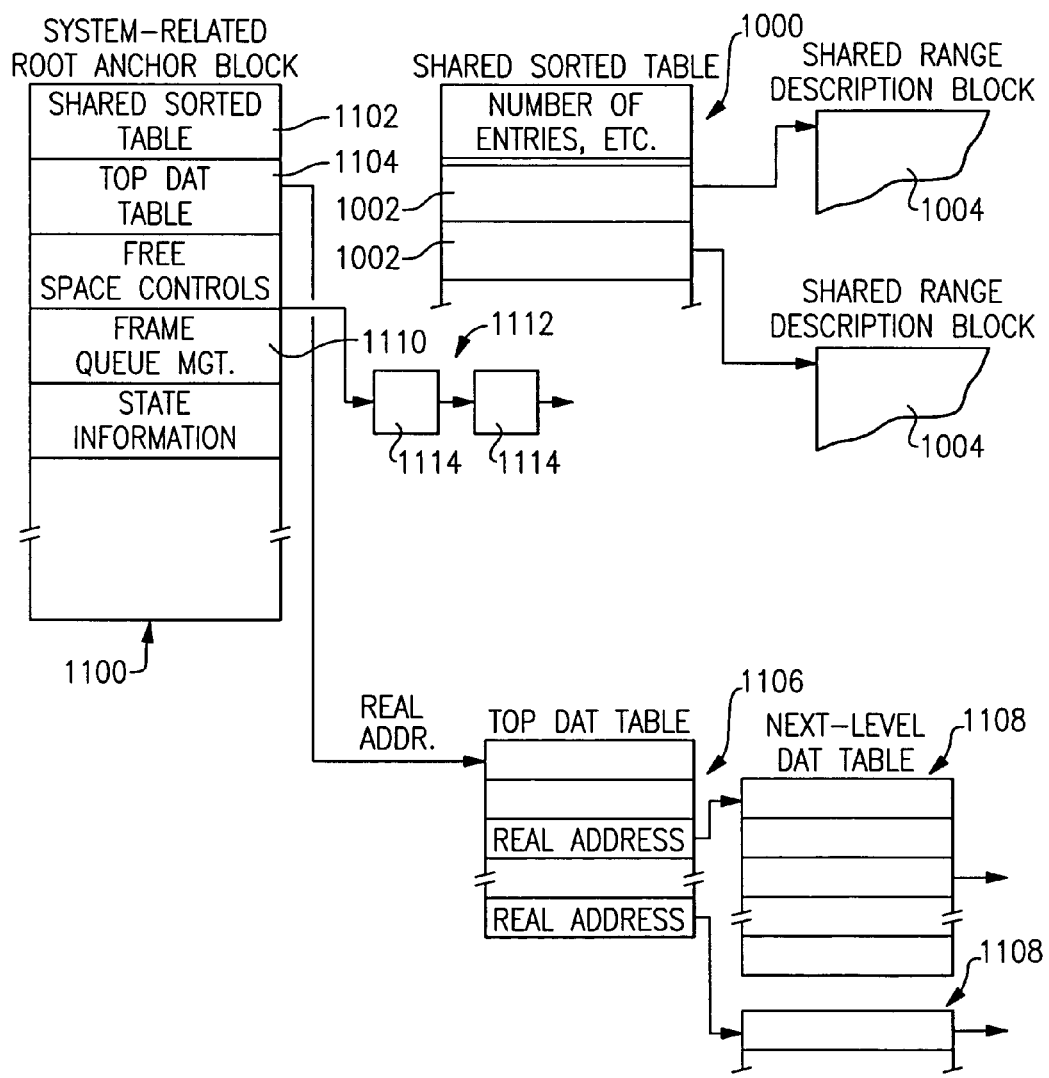
FIG. 11 shows the system-wide root anchor block shown in FIG. 10 together with related data structures.

FIG. 11 shows the entities shown in FIG. 10 plus a number of others. In particular, it depicts a system-level root anchor block 1100 for all system management control information related to shared ranges 702. Included in this root anchor block 1100 are a pointer 1102 to the shared sorted table 1000 and a pointer 1104 to the real storage location of a top shared DAT table 1106 containing pointers to lower-level shared DAT tables 1108. This top shared DAT table 1106 is used exclusively by storage management to track where the lower-level shared DAT tables 1108 are located and is not attached to the hardware translation facilities, even though it has the same format as a region table. The lower-level system-related DAT tables 1108 that are attached are exactly those that are shared with one or more address spaces that have an active addressing path through them, so this is restricted to page tables and segment tables in the preferred embodiment. Root anchor block 1100 also contains a free space queue descriptor 1110. In the preferred embodiment, the descriptor 1110 points to a queue 1112 of free space blocks 1114 that are sorted in ascending virtual address order; thus, a search for free space always finds the range 702 which requires the minimal number of levels of DAT tables for addressability as the first free block 1114 sufficient to hold the requested new shared range 702.

Figure 12:
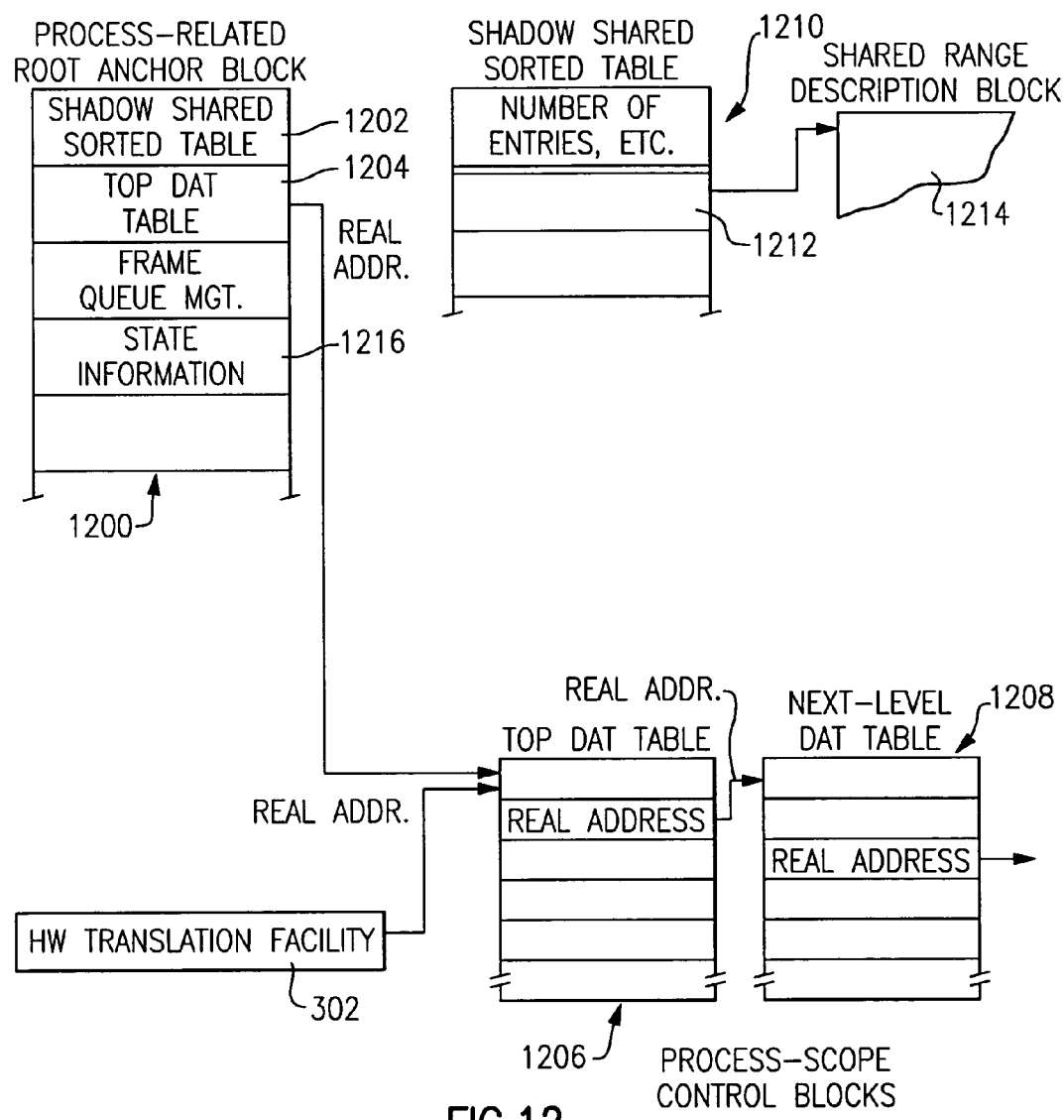
FIG. 12 shows a process-level root anchor block and related data structures.

FIG. 12 depicts a root anchor block 1200 for a typical address space 202. Included in this root anchor block 1200 is a pointer 1204 to a top DAT table 1206 for the process 108, which contains pointers to lower-level DAT tables 1208 for the process 108 and is attached to the hardware translation facilities 302 when the address space 202 is swapped in. This root anchor block 1200 also contains a pointer 1202 to a shadow shared sorted table 1210 once the address space becomes attached to a shared range. The shadow shared sorted table 1210 contains the subset of the entries in the system-wide shared sorted table 1000 that represent shared ranges 702 attached to the address space 202. Each entry in the shadow shared sorted table 1210 contains the same information as the system-wide shared sorted table 1000. Illustratively, this would be a pointer 1212 to another block 1214 whose address also resides in the shared sorted table 1000. Typically, a single address space 202 would be attached to a proper subset of the set of all allocated shared ranges 702, though it is not precluded from attaching to all such ranges. The root anchor block 1200 would typically contain other storage management information, such as anchors for frame information queues, counters, state information, etc.

Figure 13:
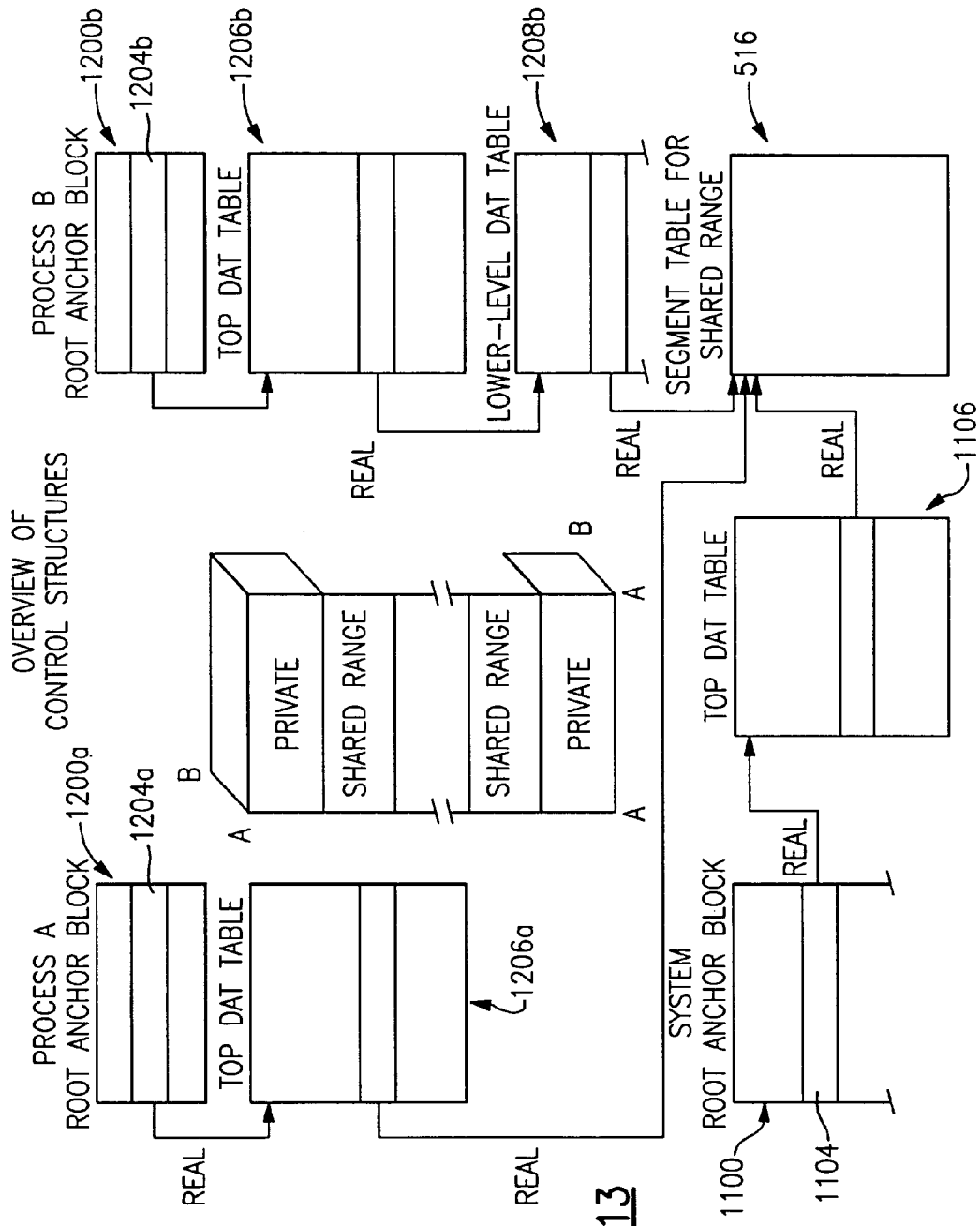
FIG. 13 shows the relation between the system-wide root anchor block shown in FIGS. 10 and 11 and the root anchor blocks of two processes.

FIG. 13 shows the root anchor blocks 1200a, 1200b for two processes 108a, 108b (processes A and B), as well as the system root anchor block 1100. It should be noted that the levels of the top DAT tables 1206a, 1206b for the processes 108a, 108b may be distinct from each other, and may be distinct from the level of the system-related top DAT table 1106. FIG. 13 would be applicable when process A has a region third table 512 for its top DAT table 1206a, process B has a region second table 508 for its top DAT table 1206b, and the system-related top shared DAT table 1106 is also a region third table 512. A shared segment table 516 indicates that region-level sharing is present. Note that a single shared range 702 using region-level sharing requires one or more such shared segment tables 516 to provide complete addressability.

When a shared range 702 is created, storage management allocates contiguous space for the request, giving preference to lower addresses to minimize the number of levels of DAT tables required to access the range. As described earlier, this uses the free space controls 1110–1114 in FIG. 11, and in the preferred embodiment automatically satisfies this property of minimizing DAT translation levels by simply choosing the first free block 1114 sufficient to hold the requested range. Installation policy may be invoked to determine whether the address space 202 is allowed to create the shared range 702. The appropriate information for the range 702 is saved and the shared sorted table 1100 in FIG. 11 is updated. Note that the operations to create a shareable range 702 and those to attach a range to a process are distinct in this embodiment, though implementations could combine these. Thus, in the embodiment shown, the shared range 702 does not appear in the shadow shared sorted table 1210 for a process 108 after creating a shared range 702, though it does appear in the system-related shared sorted table 1000.

When a shared range 702 is attached, storage management creates an entry 1212 in the shadow shared sorted table 1210 (FIG. 12) for the address space 202 to which the range 702 is attached and appropriately tracks this space as an interested participant in accessing the shared range. The access rights (read/write, read-only, or hidden) to apply for this address space 202 are specified on the attach interface (i.e., the programming interface used to associate a range with a space). As for the create interface (i.e., the programming interface used to create a shared range), installation policy may be invoked to determine whether the address space 202 is allowed to attach the shared range 702 with the specified access rights. No new DAT tables are built at the time the attach request is processed, nor is addressability to the shared range 702 established; these are instantiated as needed to resolve DAT exceptions or when needed to support system interfaces which affect the pages in the shared range.

Once a shared range 702 is attached to an address space 202, it is legitimate for the associated process 108 to reference any byte within the shared range 702, subject to the access rights in effect for the address space's attachment. The process 108 owning the address space 202 may also invoke operating system services, subject to authority controls and installation policy, to change the state of pages in the shared range 702. One such service would be to change the access rights in effect for the process 108.

Translation Exception Resolution

The following portion describes the process of building the DAT structures to resolve a translation exception for the byte causing a translation exception. In the description that follows, the byte address that causes a translation exception is referred to as the translation exception address (TEA). A virtual byte address causes a translation exception if, when it is referenced by a program, an invalid bit is set in any DAT table entry (e.g., a page table entry or a segment table entry) in the translation path for that address. However, the same general steps also apply when a system service is invoked to act on the shared range. After the translation exception resolution discussion, the operations associated with changing the access rights will be discussed, at which point it will not be necessary to dwell on the process of building the address translation structures.

Referring first to FIG. 14, when a process 108 references, or acts on a shared range 702 via system services, the operating system 106 first ensures that the process 108 is attached with the required access rights for the operation (step 1402). This is verified by use of the shadow shared sorted table 1210 (FIG. 12) for the address space 202. In the preferred embodiment, this is accomplished by a binary search of the entries 1212. Illustratively, on a translation exception in the sharable space 702, the system first verifies that the address referenced lies above the space's lowest allocated shared range origin (information obtained via the first entry 1212 of the shadow shared sorted table 1210) and below the space's highest allocated shared range address (information obtained via the highest in-use entry 1212 of the shadow shared sorted table 1210). The next check determines whether the address is above the origin of the range 702 given by the entry with index equal to half the highest in-use index, and so forth. Once the calculation converges to a single entry, a simple check is made to see if the address lies within the range 702 given by that entry

1212. Other approaches are possible, including sequential search of all entries 1212, etc.

Figure 16:
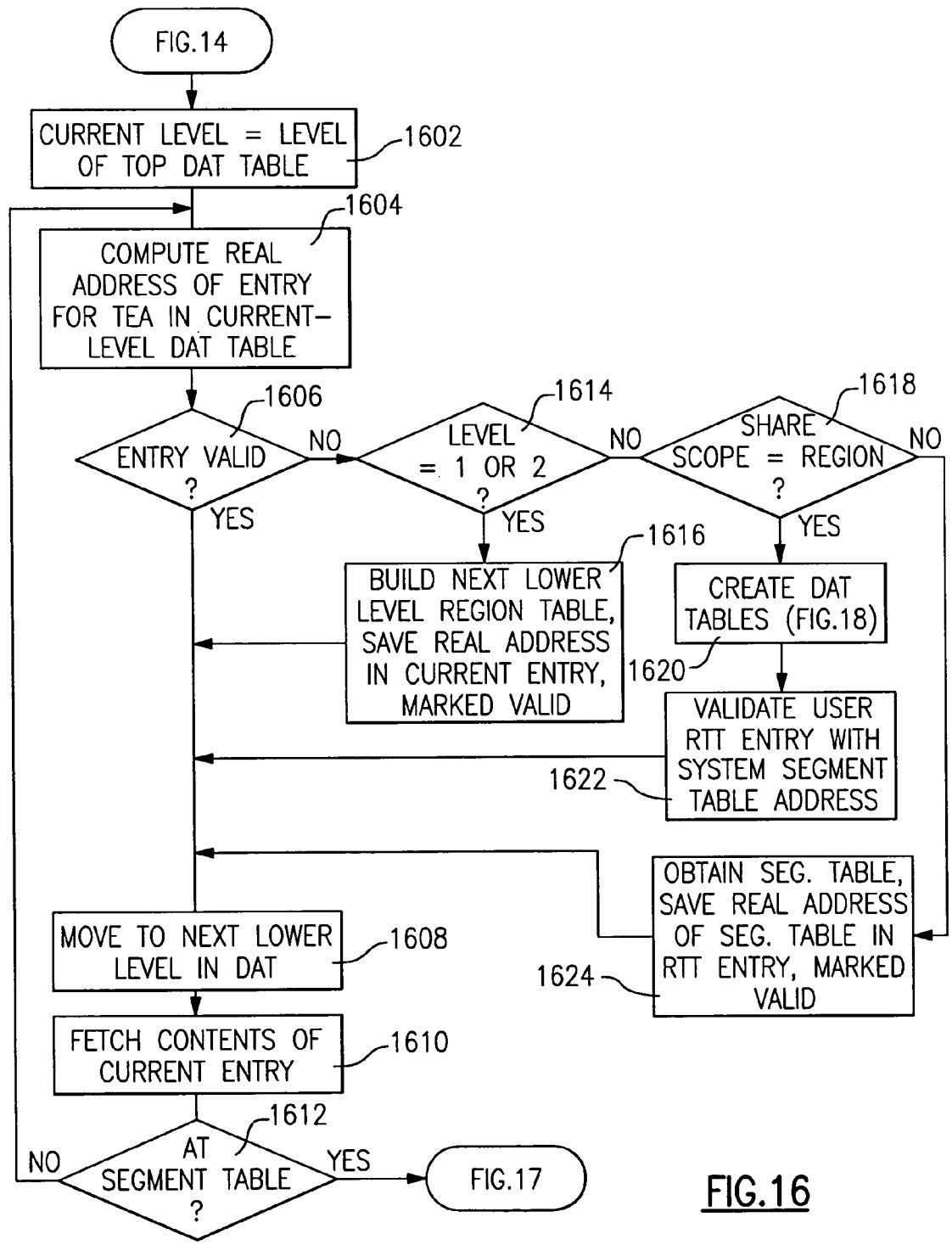
FIG. 16 shows the procedure for region-level resolution.

Once it is ascertained that the reference is legitimate, processing continues with step 1404, where the Extend Upward function (FIG. 15) is invoked for the process 108. This is described after the overview below. Upon return, the system 106 saves the real address of the new top DAT table 1206 in the hardware translation facility 302 (step 1406). Processing continues with region-level resolution (FIG. 16).

The process of translation exception resolution continues with a series of steps described in FIGS. 13–19. The system determines whether the translation exception address lies within the scope described by the space's current top DAT table 1206. The level of this table 1206, which is maintained in the root anchor block 1210 (FIG. 12), completely determines this. In the z/Architecture, the hardware makes this determination when the address is being translated and generates a unique interrupt code for the condition; this optimization is not part of this invention. When the address is implicitly referenced through invocation of a system service, the operating system 106 makes this determination by looking at the level of the top DAT table 1206, as kept in the state information (1216 in FIG. 12). When the address is not mapped by the top DAT table 1206, the system builds one or more higher-level top DAT tables 1206 until the translation exception address is within the range covered. This is described below as Extend Upward processing. This does not depend on the fact that the address is within the shareable space; it only depends on the viability of the reference. Note that Extend Upward processing is used for both process-owned DAT tables and system-related tables to track the state of shared DAT tables.

FIG. 15 shows Extend Upward processing. Referring to this figure, the system first checks (step 1502) whether the level for the top DAT table 1206 (kept in the state information 1216 in FIG. 12) is for a segment table 516. It should be noted that Extend Upward processing is used (and described later) for the system-related root anchor block 1100 and that the top DAT table 1106 or 1206 is a segment table 516 only for a process 108; the system-related root anchor block 1100 is always associated with some form of region table 512, 508 or 504. When an address space 202 only owns a segment table 516, the system builds (step 1504) a region third table 512 and saves its real address in the root anchor block 1200 for the process 108 at 1204. Part of this processing is saving the real address of the segment table 516 in entry 0 of the region third table 512 and marking that entry as valid (step 1506). The use of entry 0 results from the compatibility assumptions that the address range 0 to $2^{31}-1$ is "private" and always present; in fact, as noted above, the address space 202 initially owns only a segment table 516 to map virtual addresses 0 to $2^{31}-1$.

Extend Upward processing now continues to a common step 1508, which checks whether the translation exception address (TEA) is mapped by the top DAT table. When no top DAT table exists (only possible for the system-related root anchor block) or it is insufficient to map the TEA, the system proceeds to step 1510 in FIG. 15, which builds a region table 504, 508 or 512 for the next higher level or a region third table 512 when no top DAT table exists. This region third table 512 is associated with the TEA, rounded to a region third boundary and recorded in the state information 1216 in the root anchor block 1200 (FIG. 12). When a top DAT table already exists, part of this processing (step 1512) is to save the real address of the current top DAT table in the appropriate entry of the new region table. The entry associated with the address which is the current origin rounded to a region first, second or third boundary is marked as valid. Processing continues with step 1508 described above. When the TEA is mapped by the top DAT table, processing continues as described in FIG. 16.

Before describing the details of the remaining steps, it is helpful to take a high-level view of what follows. Now that processing has ensured that no higher levels of DAT tables are required, the system fills in the translation path for the hardware at lower levels. When the top level was level 1 (region first table 504), the system builds the level 2 DAT table (region second table 408) and then the level 3 DAT tables (region third table 512) for the translation exception address. Alternatively, the top level may only have been a level 2 or level 3, in which case fewer levels of translation tables are built. Real addresses of these new tables are saved in the appropriate entry of the immediately higher-level table, and those entries are marked valid.

Once the region third table 512 is incorporated into the DAT structure, the scope of sharing is determined. When sharing is at the region level, the system finds or builds a system shared segment table 516 to insert into the translation path of the process; this segment table 516 is not owned by the process 108 but is used in its translation; later a system-owned shared page table 520 is inserted into the system-owned segment table entry. When sharing is at the segment level, the system proceeds to build and insert a process-owned segment table 516; later the system-shared page table 520 is inserted into the process-owned translation path.

Once the address falls within the range described by the top DAT table, processing proceeds as outlined in FIG. 16. A loop is invoked to extend the DAT translation downward to the TEA. To set up for the loop, step 1602 extracts the current level of the top DAT table from the process root anchor block 1200 (kept in the state information 1216) and sets up the real address of the origin of the current DAT table. Step 1604 computes the real address of the entry within the current-level DAT table for the TEA, which is accomplished by taking the address bits associated with the level and using them as an index into the current-level DAT table. Once the entry address is known, a check is made at step 1606 to see whether the entry is already valid.

When step 1606 determines that the entry is valid, processing continues at step 1608, which simply prepares for the next iteration of the loop by updating the level as the next lower level, and step 1610, which establishes the real address of the origin of the new current DAT table by fetching from the entry which was seen to be valid at step 1606. When we are now at the level of a segment table, step 1612 directs processing to FIG. 17. Otherwise we continue the loop at step 1604, which was previously discussed.

When the test at step 1606 indicates that the entry is not valid, processing proceeds to step 1614, where a test is made to determine whether the current level is for either a region first table 504 or a region second table 508. If so, step 1616 is invoked to build the next lower-level region table, save its real address in the current entry and mark the current entry as valid. Step 1616 is followed by step 1608, which behaves as previously described. If the test at step 1614 is false, we are dealing with a region third table 512 and proceed to step 1618, which determines whether sharing is at the region level or at the segment level. The sharing level information is kept in the range description block attributes (1010 in FIG. 10).

Figure 18:
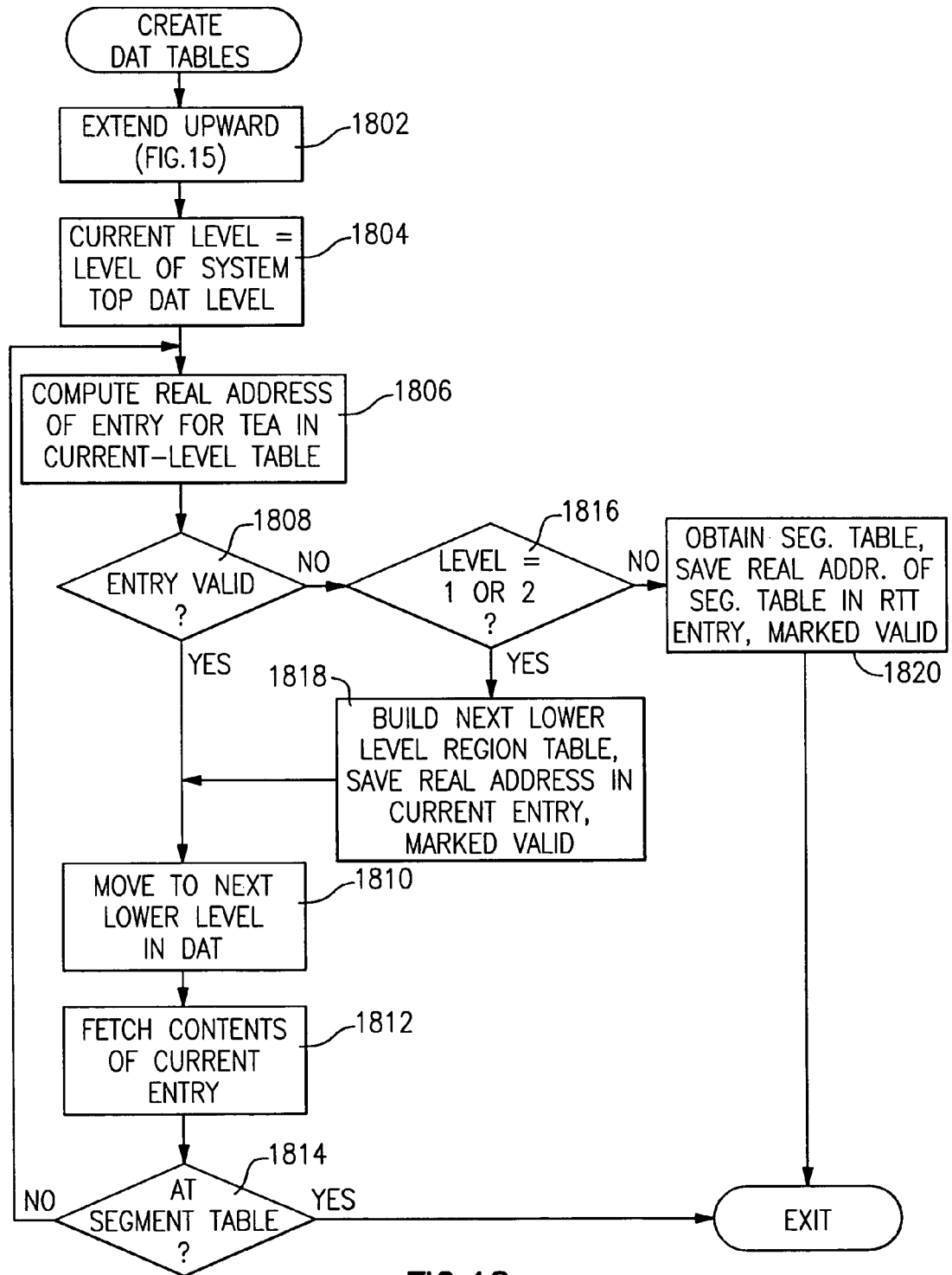
FIG. 18 shows the procedure (Create DAT Tables) for creating DAT tables.

When step 1618 sees that sharing is at the region level, step 1620 next invokes the Create DAT Tables function, shown in FIG. 18. This is followed by step 1622, which saves the real address of the system shared segment table 516 in the region third table entry for the process 108 (this is given by the loop current real address of the entry for the TEA), and marks this region third table entry as valid. Note that Create DAT Tables ensures that this system shared segment table 516 is present, and builds it if not already present. Processing continues at step 1608 which has previously been described.

When step 1618 sees that sharing is at the segment level, processing continues at step 1624, which obtains and formats a process-owned segment table 516, whose real address is saved in the current region third table entry with the entry marked as valid. Processing continues at step 1608, as described earlier.

Figure 17:
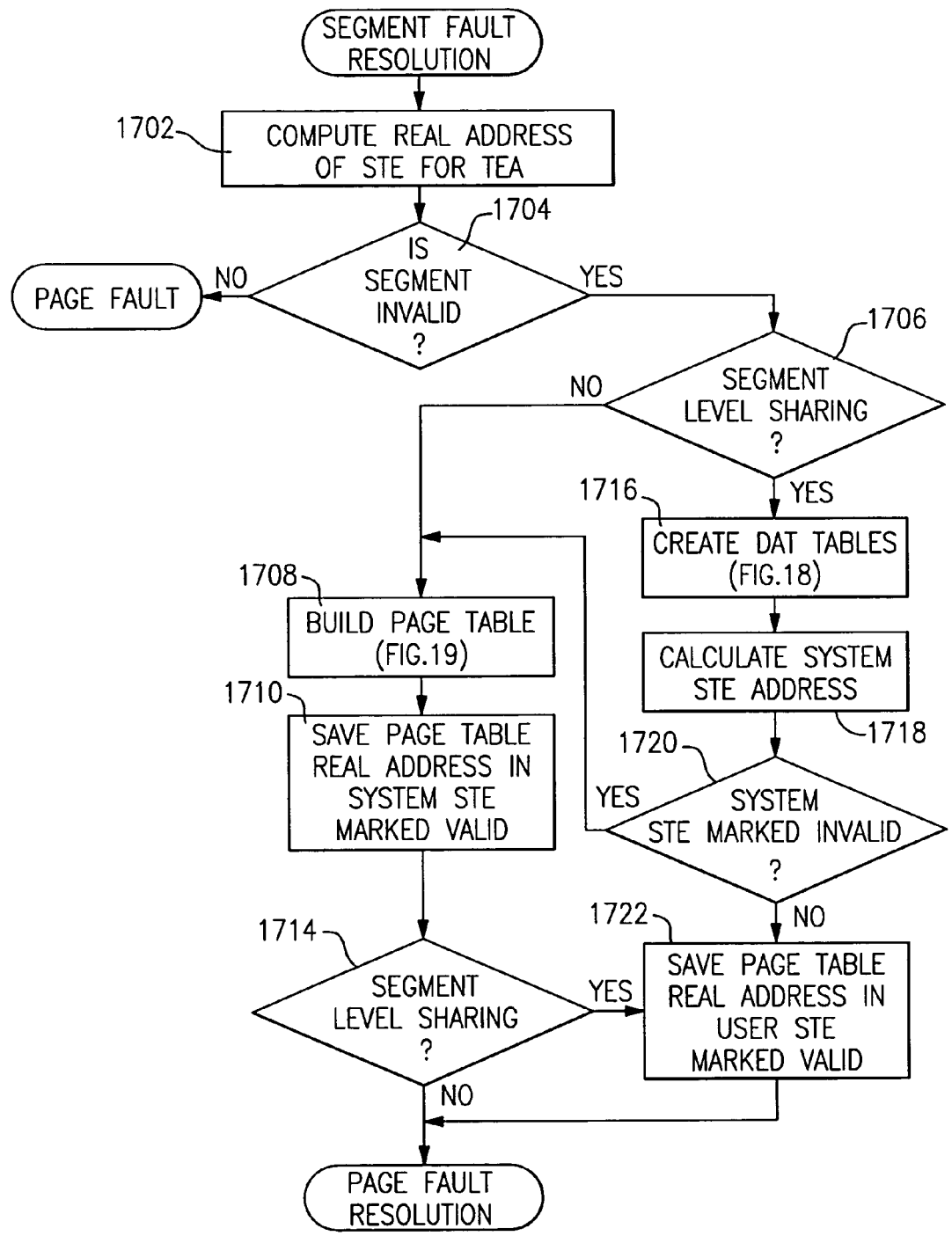
FIG. 17 shows the procedure for segment fault resolution.

FIG. 17, segment fault resolution, continues the processing from the earlier loop of FIG. 16 when the level of a segment table 516 is reached. First, step 1702 computes the real address of the segment table entry for the TEA. Next step 1704 determines whether the segment 206 is valid. If the segment 206 is valid, processing continues at the page level. Page-level processing is not germane to the current invention, as there are no new page-level controls or states; the processing described next ensures that the correct state is set in the page table entries (relevant for global change access and segment-level sharing, otherwise the page table entry does not track sharing states).

When step 1704 sees the segment is invalid, step 1706 determines whether sharing is at the region level or segment level. This information is kept in the range description block for attributes (1010 in FIG. 10).

Figure 19:
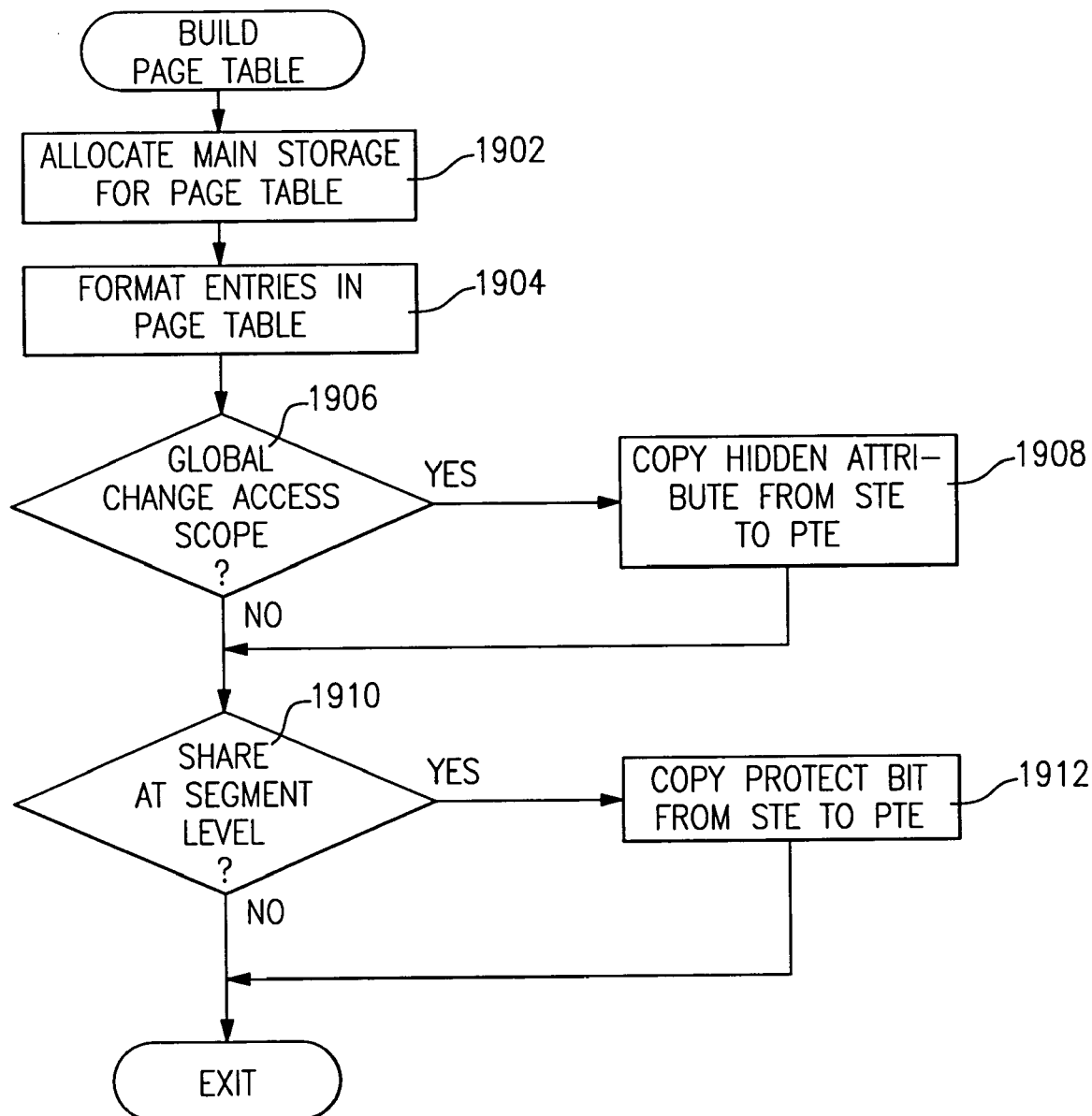
FIG. 19 shows the procedure (Build Page Table) for building a page table.

When step 1706 sees sharing is at the region level, processing continues at step 1708, which invokes the function Build Page Table (Build PGT), shown in FIG. 19, followed by step 1710, which saves the real address of the page table 520 created by Build Page Table in the segment table entry and marks the entry as valid. Note that in this case, the segment table entry is within a system-owned shared segment table 516 since this is region-level sharing. Continuing the region-level sharing case, processing continues with step 1714, which determines that processing continues at the page level, which is not germane to the current invention, as previously discussed.

When step 1706 sees sharing is at the segment level, processing continues at step 1716, which invokes the function Create DAT Tables, shown in FIG. 18. Next, step 1718 calculates the real address of the shared system segment table entry (Create DAT Tables ensures that the segment table 516 is present, and builds it if not already present). This is followed by step 1720, which determines whether the shared system segment 206 is marked valid.

When step 1720 sees this segment is valid, processing continues with step 1722 to save the real address of the system shared page table 520 in the process segment table entry, marked as valid. Finally, processing continues with page-level processing, which is not germane to the current invention, as previously discussed. When step 1720 sees the shared system segment 206 is not valid, processing continues with step 1708, which has previously been described, except that an extra step 1722 Oust described) follows step 1714 for this segment-level sharing flow.

FIG. 18 describes the Create DAT Tables function, which was previously invoked at step 1620 in FIG. 16 and step 1716 in FIG. 17. The purpose of Create DAT Tables is to build the necessary unattached DAT tables to track the state of the system shared segment and page tables 516 and 520. Unattached refers to the quality that the hardware translation facility 302 cannot find these tables (the operating system locates these tables through the system root anchor block 1100, as previously described). A segment table 516 exists for the input TEA upon completion. These latter tables are inserted into the translation path of processes 108 which have attached to shared ranges 702 at the time references are made, either explicitly or implicitly (implicitly refers to the use of system services to update the state of pages), as previously described in step 1622 of FIG. 16 and step 1722 of FIG. 17.

Processing in FIG. 18 begins with step 1802, which is an invocation of function Extend Upward, previously described in FIG. 15. Processing continues with step 1804, which extracts the current level of the system top DAT table from the system root anchor block 1100 (kept in the state information 1116 in FIG. 11) in preparation for the loop, along with the real address of the origin of the top DAT table as the current DAT table. The purpose of the loop is to extend the shared system DAT tables downward toward the TEA. Within the loop, step 1806 calculates the real address of the entry in the current DAT table which maps the TEA, which is accomplished by taking the address bits associated with the level and using them as an index into the current level DAT table. Next, step 1808 determines whether this entry is valid.

When step 1808 sees that the entry is valid, processing continues at step 1810, which simply prepares for the next iteration of the loop by establishing the level as the next lower level, and then step 1812, which establishes the real address of the origin of the new current DAT table by fetching from the entry which was seen to be valid. When we are now at the level of a segment table, step 1814 causes a return to the caller. Otherwise we continue the loop at step 1806 as previously discussed.

When the test at 1808 indicates that the entry is not valid, processing proceeds to step 1816, where a test is made to determine whether the current level is for either a region first table 504 or a region second table 508. This information is kept in the system root anchor block attributes (1116 in FIG. 11). When this is true, step 1818 is invoked to build the next lower-level region table, and to save its real address in the current entry and to mark the current entry as valid. Step 1818 is followed by step 1810, which behaves as previously described. When the test at 1816 is false, we are dealing with a region third table 512 and proceed to step 1820, which obtains and formats a system-owned segment table 516, whose real address is saved in the current region third entry with the entry marked as valid. At this point, processing is completed and return is made to the caller.

FIG. 19 describes the Build Page Table function, which was previously invoked at step 1708 in FIG. 17. The purpose of the Build Page Table function is to build a page table 520 whose real address may then be inserted into a segment table entry. The page table is always a shared entity since sharing is either at the region or segment level (never at the page level) but the corresponding segment table entry is within a system-related or a process-related segment table, respectively, depending on whether sharing is at the region or segment level.

The Build Page Table function begins with step 1902, which allocates main storage for the page table 520, and step 1904, which formats the entries within the page table 520 in accordance with the relevant architectural specifications. Next, step 1906 determines whether the shared range was created with global change access controls. This information is kept in the shared range description block attributes 1010 in FIG. 10. When this is the case, the hidden attribute is copied from the segment table entry to each page table entry in step 1908 (the hidden attribute could previously have been set by a change access request). In all cases, processing continues with step 1910, which determines whether the range is shared at the region or segment level. In the latter case, step 1912 is invoked to copy the protect bit from the segment table entry to each page table entry. No further processing is required for the function and control is returned to the caller.

Change Access Processing

Figure 20A:
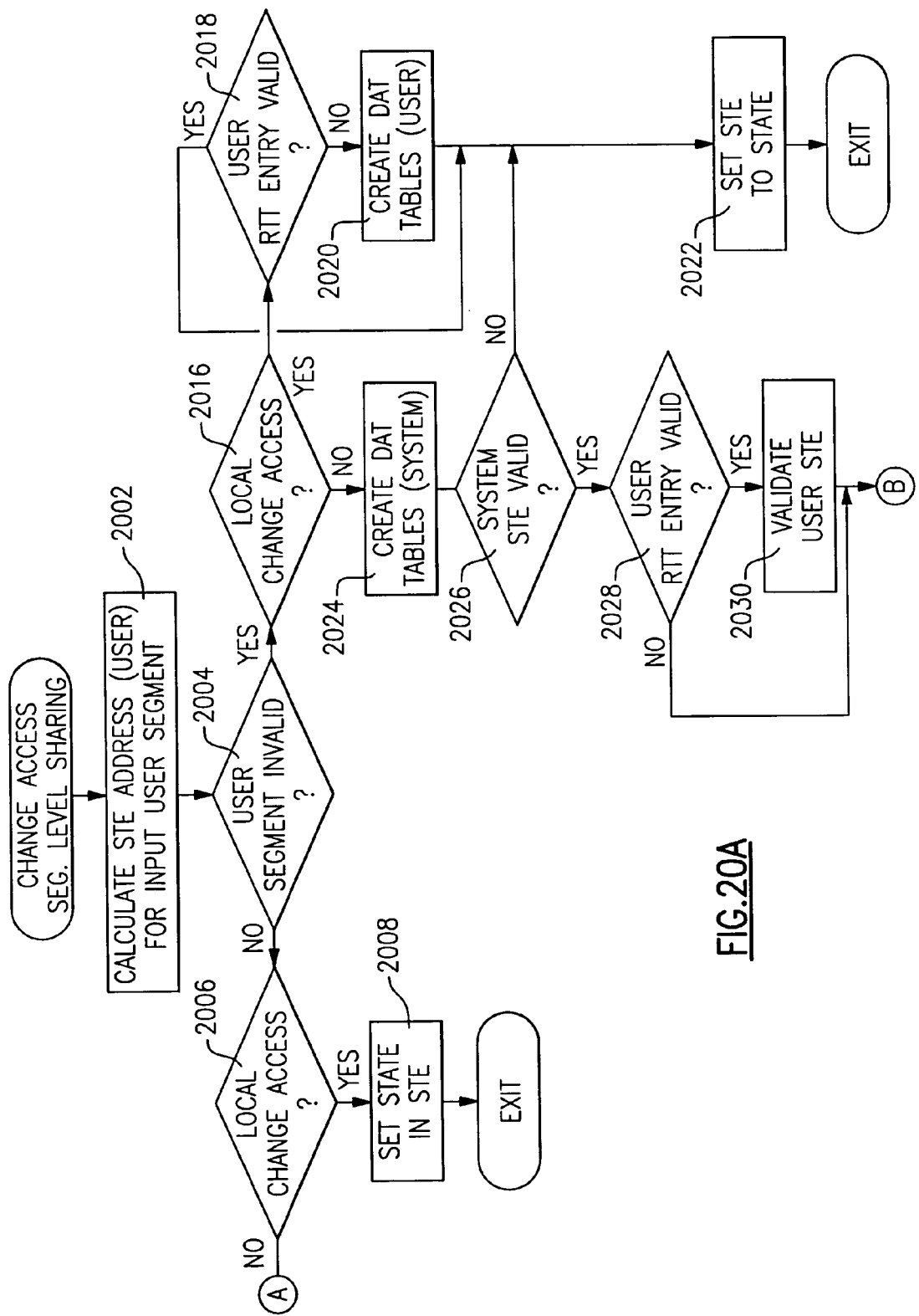
FIG. 20 (comprising FIGS. 20A–20B) shows the procedure for changing access for segment-level sharing.
Figure 21A:
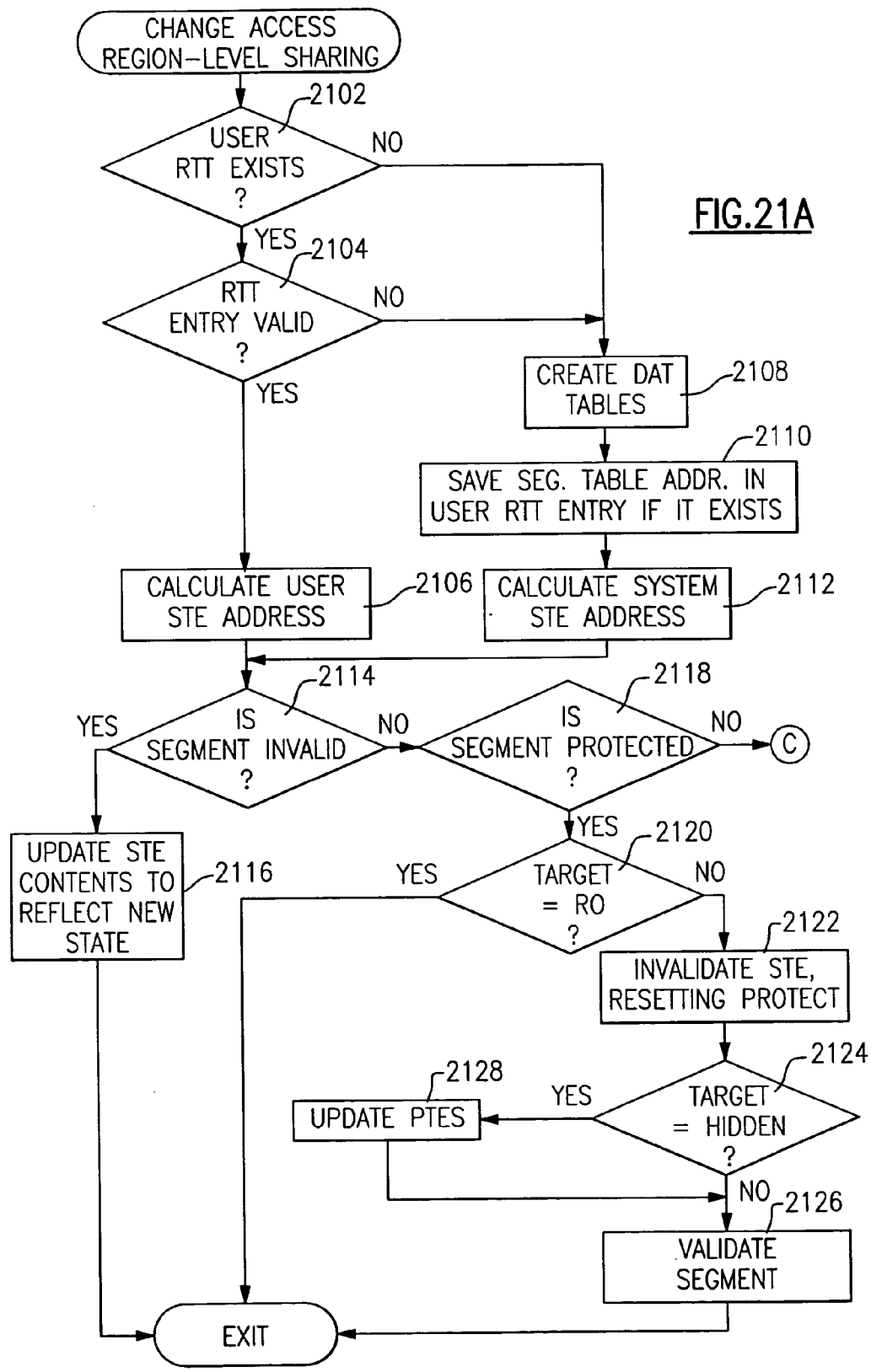
FIG. 21 (comprising FIGS. 21A–21B) shows the procedure for changing access for region-level sharing.
Figure 21B:
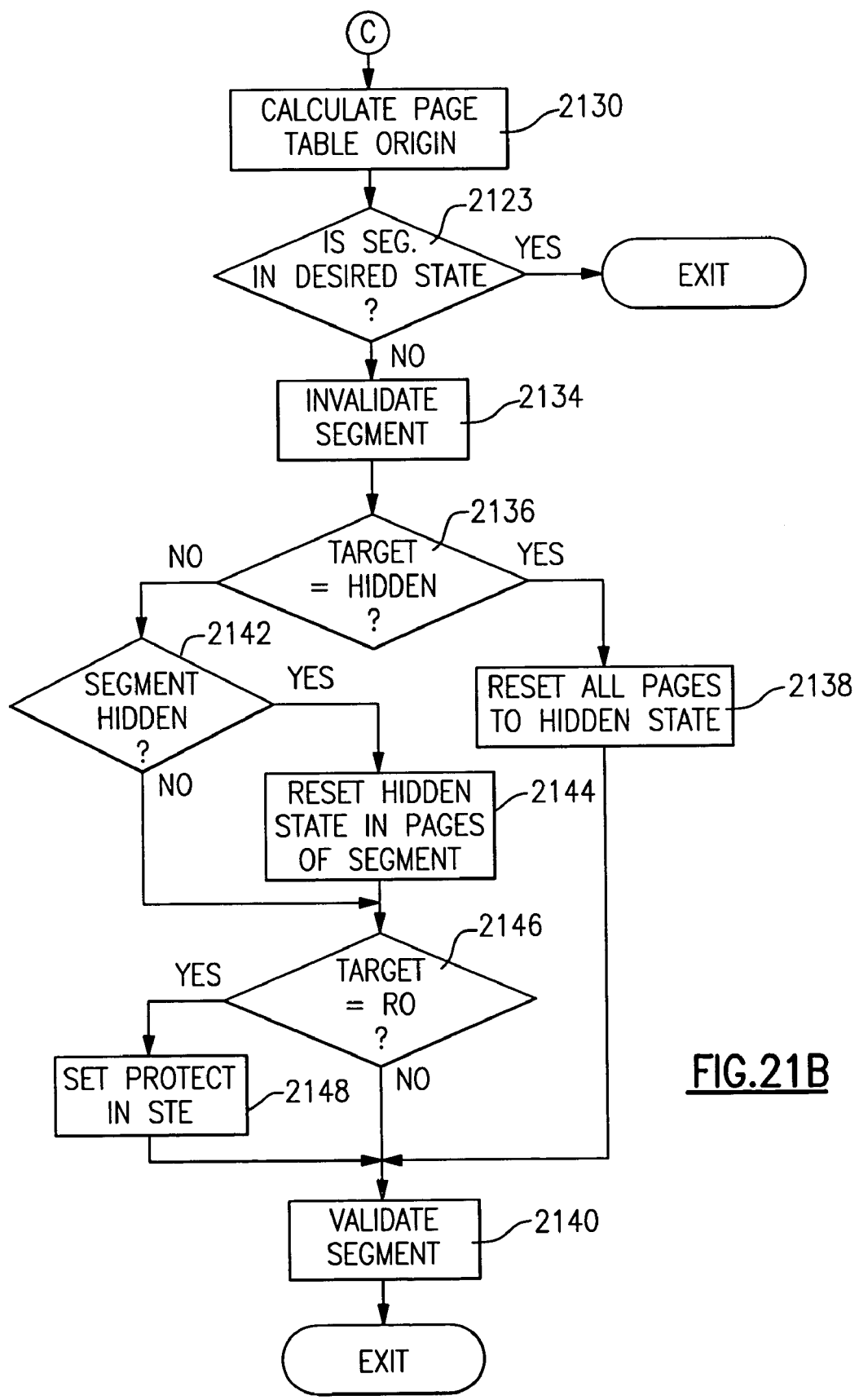

The second major function which is supported is change access for both local and global scopes. This processing is shown in FIGS. 20 and 21, and starts from the point where the process request has been validated, i.e. that the process 108 is properly attached to the requested range. In particular, the shared range description block (1004 in FIG. 10) has been located after "searching" the shared sorted table 1000. This validation activity is identical to that described in the previous pages for translation exception resolution. The change access processing discussed assumes a single segment 206, which is the smallest granularity that may be changed; consequently a loop would be in order when multiple segments 206 are affected. This does not affect the essence of the discussion. The operation for change access against a shared range 702 which supports segment-level sharing is given first, followed by the operation for change access against a shared range 702 which supports region-level sharing.

For a change access request against a shared range 702 which supports segment-level sharing, the purpose of this processing is to save the new state (hidden, read-only or read/write) in the most economical place where it either causes DAT to behave as desired or causes segment fault processing to create the correct state.

Local change access scope memory objects are always controlled by the process-related segment table entry (hidden segments are left invalid, while the protect bit reflects whether the segment is read-only or read/write) and never use page table entry-level controls.

Global change access scope memory objects may reside in one of several possible states regarding the process-owned segment table entry and the corresponding system-related segment table entry. The process-related segment table entry and the system segment table entry may both be valid, in which case the target change access state is saved in the shared page table entries (except for the protect state which is maintained in the system-related segment table entry). Secondly, the process-related segment may be invalid, but the system-related segment table entry may be valid, in which case the target change access state is saved in the shared page table entries (again, except for the protect state which is maintained in the system-related segment table entry). Finally, both the process-related segment table entry and the system-related segment table entry may be invalid, in which case the change access state is saved in the system-related segment table entry (which is left invalid).

The second case may arise with or without a process-related segment table initially. When no process-related segment table exists initially, it is not created, since it may never be needed. When a process-related segment table does exist on entry, the real address of the shared page table is saved in the process segment table entry.

The third case may arise with or without process or system-related segment tables. The system-related segment table is always built in this case, but the page table is never built for the segment. When no process-related segment table exists initially, it is never built as a result of this processing. When a process-related segment table does exist on entry, it remains intact.

Note that while we can save the protect state in the system-related segment table entry for global change access memory objects, the hidden state cannot be saved in a valid system-related segment table entry since there are no bits available to software in the z/Architecture. Thus the hidden state can only be maintained in the page table entries Referring now to FIG. 20, change access processing for segment-level sharing begins at step 2002, which calculates the real address of the process-owned segment table entry for the affected segment 206, i.e., the process-related root anchor block 1200 is used with the starting point being the top DAT table, subsequently fetching the origin of the next lower table, and calculating the appropriate entry address, etc. just as the hardware itself iteratively fetches table addresses.

Next, step 2004 determines whether the process-related segment is invalid (using the invalid indication in the segment table entry). When the segment is valid, processing continues with step 2006, which determines whether the shared range 702 was created with local change access scope, which is an attribute in the shared range description block (1010 in FIG. 10).

For local change access scope, processing is completed by step 2008, which sets the desired state information in the process-related segment table entry. When the new state is hidden, it is necessary to invalidate the segment table entry and purge the hardware translation buffer, simultaneously resetting the protect bit and setting the hidden bit in the segment table entry. When the new state is read-only or read/write, the segment is left valid while purging the hardware translation buffer, simultaneously setting/resetting the protect bit, respectively for the two cases.

When step 2006 determines that the shared range has global change access scope, processing continues at step 2010, which calculates the system-related segment table entry address, and then sets the desired state information in the system-related segment table entry. If the target state is read-only, then the protect bit is set in the system-related segment table entry, otherwise the protect bit is cleared (step 2012). Due to z/Series architectural restrictions, the hidden state cannot be saved in the valid segment table entry, thus step 2014 is used to address this and other issues. Step 2014 loops through each of the page table entries whose origin appears in the valid segment table entry. Basically, each entry is invalidated in order to change the protect state or to move the page to the hidden state, though we revalidate the page when the target state is not hidden. When the target state is hidden, the system preserves a copy of the current data, even though it is not accessible until the next change access moves the pages out of the hidden state.

When step 2004 determines that the process-related segment is invalid, processing continues with step 2016, which determines whether the shared range was created with local change access scope, which is an attribute 1010 in the shared range description block 1004 (FIG. 10).

For local change access scope, processing continues with step 2018, which determines whether the process-related region third entry for the region containing the segment is itself marked valid. When the entry is invalid, the Create DAT Tables function (FIG. 18) is invoked (step 2020) to build the process-related DAT structures, which includes the segment table and any higher-level region tables that are missing. Processing continues with step 2022 independent of the validity of the process-related region third entry. Step 2022 sets the state information in the segment table entry for the requested target state. This merely involves setting the protect and hidden bits in the segment table entry as follows: both off for a read/write target state, protect on but hidden off for a read-only target state, and hidden on but protect off for a hidden target state.

When step 2016 determines that global change access is in effect for the shared range, processing continues with step 2024, which merely invokes the Create DAT Tables function (FIG. 18) to build the system-related tracking DAT structures. Next, step 2026 determines whether the system-related segment table entry is valid. When the entry is invalid, processing continues with step 2022, where it is the system-related segment table entry that is updated. In the case that the entry is valid, processing continues with step 2028 to determine whether the process-related region third entry for the region containing the segment is valid. When this region third entry is valid, which implies that the segment table is present, processing continues with step 2030 to save the real address of the page table in the process-related segment table entry for the segment being processed. Independent of whether step 2028 finds the process-related region third entry valid, processing continues with step 2032, which merely sets the protection indication in the system-related segment table entry. Finally, processing concludes with step 2014, which has been previously described, except that it is the system-related segment table entry that is used. This concludes processing when sharing is at the segment level.

When sharing is at the region level, local change access is not supported. This is due to the fact that the z/Architecture does not support hardware protection at the region level, which would be necessary to allow local change access. Instead, the hardware protection bits at the segment table entry level are used to provide global change access controls.

Referring now to FIG. 21, change access processing for region-level sharing begins at step 2102, which determines whether a process-related region third table 512 exists and whether the region third entry for the region containing the affected segment is valid (step 2104). When both conditions are true, processing merely causes the process-related segment table entry to be used in later steps (step 2106). When either step 2102 or step 2104 is false, processing continues with step 2108, which invokes Create DAT Tables (FIG. 18) to build the necessary system-related region and segment tables for the affected segment. The process region third entry is validated with the real address of the segment table when the process region third table exists (step 2110). Step 2112 merely causes the system-related segment table entry address to be used in later steps.

Common processing resumes at step 2114, which determines whether the target segment is valid. When the target segment is invalid, processing concludes with step 2116, which is to update the segment table entry contents to reflect the target state. Specifically, when the hidden state is requested, the protect bit is reset and the hidden bit is set. When the read-only state is requested the protect bit is set and the hidden bit is reset. When the read/write state is requested, both the hidden and protect bits are reset.

Alternatively, when step 2114 determines that the target segment is valid, processing continues with step 2118, which determines whether the segment is currently protected. When the segment is protected, processing continues with step 2120, which determines whether the target state is read-only. When the target state is read-only, no further processing is required. When the target state is not read-only, processing continues with step 2122, which invalidates the segment table entry while concurrently resetting the protect bit. Step 2122 also flushes at least those hardware translation buffers which contain information about the segment. Following step 2122, step 2124 determines whether the target state is hidden. When the target state is not hidden (it would be read/write at this point), processing concludes with step 2126, which revalidates the segment.

When step 2124 determines that the target state is hidden, step 2128 next marks each of the page table entries invalid and preserves the data for each page before marking the page as hidden. Finally step 2126 is used to validate the segment. This concludes processing for a valid protected segment whose target state is not read-only. When step 2118 determines that the segment is not protected, processing continues with step 2130, which extracts the page table origin from the segment table entry. Next step 2132 determines whether the segment is currently in the desired target state. This means that if the target state is hidden, the segment is currently hidden (this may be determined by extracting the hidden indication from the first page table entry since all pages in the segment have the same hidden attribute). Secondly, when the target state is protected, the correct state would be to have the protect bit set in the segment table entry (already know this is not true based on step 2118). Finally, when the target state is read/write, the correct state would be to have the segment protect bit not set and to have the hidden state not set. When the segment is in the desired state, no further processing is necessary.

When the segment is not in the correct state, the segment is next invalidated (step 2134). This segment invalidation also flushes hardware translation buffers as described earlier for step 2122.

Next, step 2136 determines whether target state is hidden. When step 2136 sees that the target state is hidden, step 2138 next converts all pages in the segment to the hidden state as in step 2128. Processing is concluded with step 2140 which validates the segment.

When step 2136 determines that the target state is not hidden, step 2142 now determines whether the segment is currently hidden, as reflected in the page table entry for the first page in the segment. When the segment is hidden, step 2144 next resets the hidden state in each page table entry. Whether the segment is hidden or not, the next step (step 2146) determines whether the target is read-only. When the target is read-only, processing next sets (step 2148) the segment protect bit and then validates the segment (2140). When the target is not read-only (is read/write), processing proceeds to a final step, 2140, which validates the segment. This concludes processing for change access requests for region-level sharing ranges.

The present invention provides a way to support sharing without allocating a new band of virtual storage across all address spaces for management purposes as has been prevalent in other implementations. The present invention extends technology which eliminates the need for real storage to back virtualized generic page tables otherwise required in the current art.

The present invention reaps a further advantage since it does not attach the generic page tables used for management of sharing to the hardware translation mechanism. Thus the overhead associated with unattaching such management tables, which includes signaling all processors, waiting for them to reach end of operation (typically end of instruction), and purging the translation buffers, is avoided. This activity is still necessary with respect to the process owned DAT tables since they are attached in order for the hardware to perform DAT.

The present invention similarly reduces this invalidation overhead by choosing not to reduce the number of levels of DAT tables when shared virtual storage is returned which would otherwise allow fewer levels of translation. This avoids a thrashing condition which would arise if the application were to reacquire access to shared virtual storage at the same level of the translation hierarchy. The minimum number of levels of DAT tables is reestablished during swap-out/swap-in processing when the invalidation overhead is already built in.

Under the method of the present invention, this swap-in logic does not build any DAT tables for shared ranges; it only builds DAT tables for working set private pages. This solves a problem for shared storage which is that the operating system cannot determine which pages in the shared range are actually in use by a given process, since there is a single reference bit for a shared page which does not distinguish which process set it (same as for private pages). When the process reaccesses shared addresses, the DAT structure is extended as needed for the current use.

The present invention supports a full 64-bit address range while still allowing the minimal three levels of DAT tables to cover both shared and private virtual storage up to the span of a region third table. Other approaches have a single private-shareable boundary, while the present invention introduces two such boundaries. The former approach either restricts the total size of one area to less than a region third table or forces use of a region second (or first) table to access any portion of one of the areas.

The present invention allows selective use of the virtual addresses within the shareable area without mapping these addresses to private storage. Such a restriction cuts the effective addressing in half (or worse) for all applications since the mapped range occupies virtual storage in both the private and shareable area. The unused portion of the shareable area detracts from the usable space in any approach.

The present invention supports both global and local sharing access modes (as described in the specification) for new or modified programs, while providing the above features in a fashion that allows existing 31-bit applications to run unchanged.

While a particular embodiment has been shown and described, various modifications will be apparent to those skilled in the art.

What is claimed is:

1. In an information handling system in which each of a plurality of processes managed by an operating system has a virtual address space comprising ranges of virtual addresses that are mapped to a corresponding set of real addresses representing addresses in real storage, a method for managing shared virtual storage comprising the steps of:
   providing for each of a plurality of virtual address spaces a set of process-level dynamic address translation (DAT) tables for converting virtual address references to real addresses by providing a translation path of table references, said sets of DAT tables having a shred subset of DAT tables that are common to said plurality of virtual address spaces and map a shared range of virtual addresses in each of said virtual address spaces to a common set of real addresses; and
   providing a set of one or more system-level DAT tables for managing said shared ranges, said system-level DAT tables referencing said shared subset of DAT tables of said process-level DAT tables but not being in a translation path of any of said process-level DAT tables.

2. The method of claim 1 in which said sets of process-level DAT tables also have non-shared subsets of DAT tables that are not common to said virtual address spaces and in which said non-shared subsets of DAT tables are maintained even when no longer required by said virtual address spaces.

3. In an information handling system in which each of a plurality of processes managed by an operating system has a virtual address space comprising ranges of virtual addresses that are mapped to a corresponding set of real addresses representing addresses in real storage and in which a plurality of levels of translation tables are used to map said virtual address space to said real addresses representing addresses in real storage, a method for managing shared virtual storage comprising the steps of:
   creating for one of said virtual address spaces a set of dynamic address translation (DAT) tables for converting virtual address references to real addresses, said set of DAT tables having a shared subset of DAT tables that are shared with another virtual address space and having a non-shared subset of DAT tables that are not shared with another virtual address space; and
   maintaining said non-shared subset of DAT tables even when no longer required by said virtual address space.

4. The method of claim 3 in which said sets of DAT tables have non-shared subsets of DAT tables that are not common to said virtual address spaces and in which only said non-shared subsets of DAT tables and not said shared subset of DAT tables are rebuilt during swap-in processing.

5. In an information handling system in which each of a plurality of processes managed by an operating system has a virtual address space comprising a range of virtual addresses that are mapped to a corresponding set of real addresses representing addresses in real storage and in which a predetermined maximum number of levels of translation tables are potentially used to map said virtual address space to said real addresses representing addresses in real storage, a method for managing shared virtual storage comprising the steps of:
   defining for a virtual address space a shared range of virtual addresses that are mapped along with virtual address ranges of other address spaces to a common set of real addresses;
   defining for said virtual address space a first private range of virtual addresses that are lower than said shared range of virtual addresses and are mapped to a first set of real addresses that are private to that address space, said shared range and said first private range occupying a virtual address range requiring fewer than said predetermined maximum number of levels of said translation tables; and
   defining for said virtual address space a second private range of virtual addresses that are higher than said shared range of virtual addresses and are mapped to a second set of real addresses that are private to that address space.

6. The method of claim 5 in which up to five levels of translation tables are used to map said virtual address space to real storage, said shared range and said first private range occupy a virtual address range requiring no more than three levels of said translation tables.

7. The method of claim 5 in which said virtual address space is a 64-bit address space, said shared range and said first private range occupying a virtual address range that is addressable using no more than 42 bits.

8. In an information handling system in which each of a plurality of processes managed by an operating system has a virtual address space comprising a range of virtual addresses that are mapped to a corresponding set of real addresses representing addresses in real storage, a method for managing shared virtual storage comprising the steps of:
  defining for each of a plurality of virtual address spaces a shared range of virtual addresses that are mapped to a common set of real addresses; and
  specifying whether said common set of real addresses is shared by said virtual address spaces with global access rights whereby each virtual address space has the same access rights or with local access rights whereby each virtual address space has individually specified access rights to said common range.

9. The method of claim 8 in which a plurality of shared ranges of virtual addresses of different virtual address spaces are mapped to each of a plurality of common sets of real addresses, said specifying step comprising the step of:
  individually specifying for each of said common ranges whether it is shared with global access rights or with local access rights.

10. The method of claim 8 in which said global or local access rights are specifiable for a shared range of virtual addresses only when the shared range is first defined.

11. The method of claim 8, comprising the further step of:
  specifying access rights for one of said virtual address spaces to said common range.

12. The method of claim 11, comprising the further steps of:
  modifying the access rights of only said one of said virtual address spaces if said common set of real addresses are shared with local access rights; and
  correspondingly modifying the access rights of each of said virtual address spaces if said common set of real addresses are shared with global access rights.

13. The method of claim 11 in which said one of said virtual address spaces uses a set of translation tables to map its virtual addresses to real addresses, said access rights of said one of said virtual address spaces to said common range being specified in said translation tables.

14. The method of claim 13 in which said access rights of said one of said virtual address spaces to said common range are local access rights and are specified in a portion of said translation tables that is not shared with other address spaces.

15. In an information handling system in which each of a plurality of processes managed by an operating system has a virtual address space comprising ranges of virtual addresses that are mapped to a corresponding set of real addresses representing addresses in real storage, apparatus for managing shared virtual storage comprising:
  a set of process-level dynamic address translation (DAT) tables for each of a plurality of virtual address spaces for converting virtual address references to real addresses by providing a translation path of table references, said sets of DAT tables having a shared subset of DAT tables that are common to said plurality of virtual address spaces and map a shared range of virtual addresses in each of said virtual address spaces to a common set of real addresses; and
  a set of one or more system-level DAT tables for managing said shared ranges, said system-level DAT tables referencing said shared subset of DAT tables of said process-level DAT tables but not being in a translation path of any of said process-level DAT tables.

16. In an information handling system in which each of a plurality of processes managed by an operating system has a virtual address space comprising a ranges of virtual addresses that are mapped to a corresponding range of real addresses representing addresses in real storage and in which a plurality of levels of translation tables are used to map said virtual address space to said real addresses representing addresses in real storage, apparatus for managing shared virtual storage comprising:
  logic for creating for one of said virtual address spaces a set of dynamic address translation (DAT) tables for converting virtual address references to real addresses, said sets of DAT tables having a shared subset of DAT tables that are shared with another virtual address space and having a non-shared subset of DAT tables that are not shared with another virtual address space; and
  logic for maintaining said non-shared subset of DAT tables even when no longer required by said virtual address space.

17. The apparatus of claim 16 in which said sets of DAT tables have non-shared subsets of DAT tables that are not common to said virtual address spaces and in which only said non-shared subsets of DAT tables and not said shared subset of DAT tables are rebuilt dining swap-in processing.

18. In an information handling system in which each of a plurality of processes managed by an operating system has a virtual address space comprising a range of virtual addresses that are mapped to a corresponding set of real addresses representing addresses in real storage and in which a predetermined maximum number of levels of translation tables are potentially used to map said virtual address space to said real addresses representing addresses in real storage, apparatus for managing shared virtual storage comprising:
  logic for defining for a virtual address space a shared range of virtual addresses that are mapped along with virtual address ranges of other address spaces to a common set of real addresses;
  logic for defining for said virtual address space a first private range of virtual addresses that are lower than said shared range of virtual addresses and are mapped to a first set of real addresses that are private to that address space, said shared range and said first private range occupying a virtual address range requiring fewer than said predetermined maximum number of levels of said translation tables; and
  logic for defining for said virtual address space a second private range of virtual addresses that are higher than said shared range of virtual addresses and are mapped to a second set of real addresses that are private to that address space.

19. In an information handling system in which each of a plurality of processes managed by an operating system has a virtual address space comprising a range of virtual addresses that are mapped to a corresponding set of real addresses representing addresses in real storage, apparatus for managing shared virtual storage comprising:
  logic for defining for each of a plurality of virtual address spaces a shared range of virtual addresses that are mapped to a common range of real addresses; and
  logic for specifying whether said common set of real addresses is shared by said virtual address spaces with global access rights whereby each virtual address space has the same access rights or with local access rights whereby each virtual address space has individually specified access rights to said common range.

20. A program storage device readable by a machine, tangibly embodying a program of instructions executable by the machine to perform method steps for managing shared virtual storage in an information handling system in which each of a plurality of processes managed by an operating system has a virtual address space comprising a ranges of virtual addresses that are mapped to a corresponding set of real addresses representing addresses in real storage, said method steps comprising:

providing for each of a plurality of virtual address spaces a set of process-level dynamic translation (DAT) tables for converting virtual address references to real addresses by providing a translation path of table references, said sets of DAT tables having a shared subset of DAT tables that are common to said plurality of virtual address spaces and map a shared range of virtual addresses in each of said virtual address spaces to a common set of real addresses; and providing a set of one or more system-level DAT tables for managing said shared ranges, said system-level DAT tables referencing said shared subset of DAT tables of said process-level DAT tables but not being in a translation path of any of said process-level DAT tables.

21. A program storage device readable by a machine, tangibly embodying a program of instructions executable by the machine to perform method steps for managing shred virtual storage in an information handling system in which each of a plurality of processes managed by an operating system has a virtual address space comprising ranges of virtual addresses that are mapped to a corresponding set of real addresses representing addresses in real storage and in which a plurality of levels of translation tables are used to map said virtual address space to said real addresses representing addresses in real storage, said method steps comprising:

creating for one of said virtual address spaces a set of dynamic address translation (DAT) tables for converting virtual address references to real addresses, said set of DAT tables having a shared subset of DAT tables that are shared with another virtual address space and having a non-shared subset of DAT tables that are not shared with another virtual address space; and maintaining said non-shared subset of DAT tables even when no longer required by said virtual address space.

22. The program storage device of claim 21 in which said sets of DAT tables have non-shared subsets of DAT tables that are not common to said virtual address spaces and in which only said non-shared subsets of DAT tables and not said shared subset of DAT tables are rebuilt during swap-in processing.

23. A program storage device readable by a machine, tangibly embodying a program of instructions executable by the machine to perform method steps for managing shared virtual storage in an information handling system in which each of a plurality of processes managed by an operating system has a virtual address space comprising a ranges of virtual addresses that are mapped to a corresponding set of real addresses representing addresses in real storage and in which a predetermined maximum number of levels of translation tables are potentially used to map said virtual address space to said real addresses representing addresses in real storage, said method steps comprising:

defining for a virtual address space a shared range of virtual addresses that are mapped along with virtual address ranges of other address spaces to a common set of real addresses;

defining for said virtual address space a first private range of virtual addresses that are lower than said shared range of virtual addresses and are mapped to a first set of real addresses that are private to that address space, said shared range and said first private range occupying a virtual address range requiring fewer than said predetermined maximum number of levels of said translation tables; and defining for said virtual address space a second private range of virtual addresses that are higher than said shared range of virtual addresses and are mapped to a second range of real addresses that are private to that address space.

24. A program storage device readable by a machine, tangibly embodying a program of instructions executable by the machine to perform method steps for managing shared virtual storage in an information handling system in which each of a plurality of processes managed by an operating system has a virtual address space comprising a ranges of virtual addresses that are mapped to a corresponding set of real addresses representing addresses in real storage, said method steps comprising:

defining for each of a plurality of virtual address spaces a shared range of virtual addresses that are mapped to a common set of real addresses; and specifying whether said common set of real addresses is shared by said virtual address spaces with global access rights whereby each virtual address space has the same access rights or with local access rights whereby each virtual address space has individually specified access rights to said common range.

* * * * *